US012572519B2

(12) United States Patent
Rahimov et al.

(10) Patent No.: US 12,572,519 B2
(45) Date of Patent: Mar. 10, 2026

(54) SYSTEM AND METHOD FOR IDENTIFYING AND DETERMINING A CONTENT SOURCE

(71) Applicant: Polygraf Inc., Georgetown, TX (US)

(72) Inventors: Yagub Rahimov, Georgetown, TX (US); Vignesh Karumbaya, Oak Park, IL (US); Ali Asgarov, Nasimi Region (AZ); Eljan Mahammadli, Baku (AZ); Toghrul Tahirov, Baku (AZ)

(73) Assignee: Polygraf Inc., Georgetown, TX (US)

( * ) Notice: Subject to any disclaimer, the term of this patent is extended or adjusted under 35 U.S.C. 154(b) by 0 days.

(21) Appl. No.: 18/951,424

(22) Filed: Nov. 18, 2024

(65) Prior Publication Data

US 2025/0165444 A1     May 22, 2025

Related U.S. Application Data

(60) Provisional application No. 63/600,453, filed on Nov. 17, 2023.

(51) Int. Cl.
*G06F 16/215* (2019.01)
(52) U.S. Cl.
CPC .................................. *G06F 16/215* (2019.01)
(58) Field of Classification Search
CPC ...... G06F 16/215; G06F 16/21; G06F 16/217; G06F 16/2282; G06F 11/3409
See application file for complete search history.

(56) References Cited

U.S. PATENT DOCUMENTS

| | | | | |
|---|---|---|---|---|
| 6,148,427 | A * | 11/2000 | Sherwood | ...... G01R 31/318307 |
| | | | | 714/E11.208 |
| 9,961,204 | B1 * | 5/2018 | Moran | ............. G06Q 10/06393 |
| 12,321,831 | B1 * | 6/2025 | Karpman | ............... G06N 20/00 |
| 2021/0042344 | A1 * | 2/2021 | Hu | ........................... G06N 3/08 |
| 2021/0065039 | A1 * | 3/2021 | Santhanam | ............. G06N 5/02 |
| 2021/0232911 | A1 * | 7/2021 | Velagapudi | ............. G06N 3/09 |
| 2022/0284045 | A1 * | 9/2022 | Saha | ....................... G06F 16/35 |
| 2024/0338612 | A1 * | 10/2024 | Goldszmidt | ........ G06F 18/2415 |

* cited by examiner

*Primary Examiner* — Kavita Stanley
*Assistant Examiner* — Cecile H Vo
(74) *Attorney, Agent, or Firm* — Nelson Mullins Riley & Scarborough LLP; Anthony A. Laurentano

(57) ABSTRACT

A computer-implemented method for processing input data and determining a source of model-generated data in the input data. The method can be performed by at least one computer processor executing computer-readable instructions tangibly stored on at least one computer-readable medium comprising the steps of preprocessing the input data to clean and normalize the input data and generating in response normalized data, detecting if the model-generated data is present within the normalized data, and determining, based on a final score data, the source of the model-generated data.

30 Claims, 4 Drawing Sheets

SYSTEM AND METHOD FOR IDENTIFYING AND DETERMINING A CONTENT SOURCE

RELATED APPLICATION

The present application claims priority to U.S. provisional patent application Ser. No. 63/600,453, filed on Nov. 17, 2023, entitled System and Method For Identifying and Determining A Content Source, the contents of which are herein incorporated by reference.

BACKGROUND OF THE INVENTION

The present invention relates to systems and methods for processing and identifying information, and more specifically relates to systems and methods for identifying and determining the source of the information.

Modern data networks and associated systems employ machine learning models to process data and can employ systems and techniques for governing the dissemination of data. Conventional systems typically employ data networks that connect with servers and networks outside of the enterprise network, and as such are not deemed to be truly local networks (e.g., on premises).

Conventional systems and methods also exist for identifying information resident in the system networks and typically involves a combination of manual and automated techniques. The conventional techniques can be configured to detect and protect information, such as confidential data, from unauthorized access, disclosure, or manipulation. The conventional systems can employ data access and classification policies and procedures that categorize the data based on the sensitivity of the data. The computer networks can also employ automated data monitoring techniques that analyze the network data in an effort to determine if unauthorized system activity is occurring.

A drawback of these conventional systems and methods is that they are time and resource intensive, and the systems are not guaranteed to detect and protect all of the necessary confidential information resident within the system.

Conventional systems exist to further analyze content data to determine the authenticity of the content, and typically rely on a combination of automated and manual methods. According to one conventional technique, if content is generated by a user, the user can sign the generated content using cryptographic techniques, thus creating a unique digital signature. The receiver or recipient of the content can then verify the signature to ensure that the content was generated by the user. Although this conventional technique provides for a selected level of security, the methodology requires the participation of and cooperation from the user (e.g., content creator) and the recipient. Further, not all types of content are amenable to digital signatures.

The development of commercially available large language models (LLMs). such as GPT4, GPT-4o, Claude, Gemini, LLAMA, Mistral, has led to an increase in AI-generated content that is often indistinguishable from human-authored content. With this, the challenge of detecting such content has become crucial in areas like content moderation, academic integrity, and legal verification.

Existing solutions for detecting AI-generated content lack the ability to identify the specific AI model used to generate the content, and they are often vulnerable to adversarial inputs such as intentional typos, grammatical errors, or subtle manipulation in the text. Furthermore, most current conventional systems and methods do not offer explainability or transparency in terms of where the AI-generated content appears in mixed-authorship content. The present invention addresses these gaps by introducing a robust, explainable AI-generated content detection system.

SUMMARY OF THE INVENTION

The present invention is directed to a comprehensive data identification system and method for detecting model-generated data (e.g., artificial intelligence (AI) generated content), scoring and highlighting the data, and then determining the source or model used to generate the model-generated content. The data identification system of the present invention can employ a transformer-based detection model that can be fine-tuned on a balanced dataset of model-generated data and human-generated data. The present invention can also employ a shifting window analysis method as part of the data detection step to accurately detect model-generated content within mixed-authorship content (e.g., input data).

The present invention is directed to a computer-implemented method for processing input data and determining a source of model-generated data in the input data. The method can be performed by at least one computer processor executing computer-readable instructions tangibly stored on at least one computer-readable medium comprising the steps of preprocessing the input data to clean and normalize the input data and generating in response normalized data, detecting if the model-generated data is present within the normalized data, and determining, based on a final score data, the source of the model-generated data. The set of preprocessing the input data to clean and normalize the input data and generating in response normalized data can include the steps of cleaning the input data and generating cleaned data, tokenizing the cleaned data and generating tokenized data, mitigating bias present within the tokenized data by applying a first transformer type machine learning model thereto and then generating in response bias mitigated data, and normalizing the bias mitigated data and generating normalized data. The step of detecting if the model-generated data is present within the normalized data includes the step of segmenting the normalized data into a discrete data segments using a tokenization technique and then generating segmented data, applying a shifting windowing function to the segmented data to define, via a data window, a selected window size of segmented data and then generating window data in response thereto, applying a second transformer type machine learning model to the window data and generating one or more probability scores based on the window data, wherein the probability score is indicative of a likelihood that the window data includes model-generated data, and then generating scoring data in response to the window data, highlighting one or more portions of the scoring data that includes the model-generated data, and then generating highlight data in response to the scoring data, and determining a final probability score based on the highlighted data and then generating final score data.

The step of mitigating bias present within the tokenized data includes applying a first transformer type machine learning model (a T5 based sequence-to-sequence model) to the tokenized data and training the T5 based sequence-to-sequence model on a dataset that includes paired data that includes a raw text data and a corrected text data. The second transformer type machine learning model is a bidirectional encoder representations from transformer (BERT) model. The step of applying a shifting windowing function to the segmented data comprises defining the data window to have a selected window size with the shifting windowing function, wherein the window size corresponds to a plurality of sentences, wherein the plurality of sentences includes at least a first sentence, a second sentence, and a third sentence. The step of applying a second transformer type machine learning model to the window data and generating one or more probability scores comprises determining a probability score associated with each of the first sentence, the second sentence, and the third sentence.

The method further includes shifting the data window by at least one sentence to form a new data window, wherein the new data window includes at least the second sentence, the third sentence, and a fourth sentence, and determining a probability score for each of the second sentence, the third sentence, and the fourth sentence in the new data window. For each of the sentences that have multiple probability scores associated therewith, the method is configured to determine an average probability score from the multiple probability scores for each sentence. The step of highlighting one or more portions of the scoring data comprises classifying the scoring data into a plurality of selected scoring categories. Further, the step of determining a final probability score comprises determining the final probability score by averaging the probability scores associated with each sentence in the highlighted data, and the step of determining a model source comprises applying a third transformer type machine learning model to the final score data for determining the model source based on the final score data. The third transformer-type machine learning model comprises a robustly optimized BERT approach (RoBERTa) model to process the final score data and to classify the final score data into one or more of a plurality of classifications corresponding to selected types of machine learning models. The method can also determine whether portions of the normalized data are human-generated data and to determine the source of the human-generated data, where the step of determining whether portions of the normalized data are human-generated data comprises applying a contextual similarity technique to determine the source of the human-generated data.

The present invention is also directed to a system for processing input data and determining a source of model-generated data in the input data, comprising a preprocessing unit, a model detection unit, and a model source detection unit. The preprocessing unit can be configured for preprocessing the input data so as to clean and to normalize the input data and generating in response normalized data. The preprocessing unit can include a cleaning unit for cleaning the input data and generating cleaned data, a tokenization unit for tokenizing the cleaned data and generating tokenized data, a bias mitigation unit for applying a first transformer type machine learning model to the tokenized data to mitigate any bias present within the tokenized data and for generating bias mitigated data, and a normalization unit for normalizing the bias mitigated data and generating in response the normalized data. The model detection unit can be configured for detecting model-generated data within the normalized data, scoring the model-generated data, and then highlighting the model-generated data. The model detection unit can include a segmentation unit for segmenting the normalized data into discrete data segments using a tokenization technique and then generating segmented data, a shifting window analysis unit for applying a shifting windowing function to the segmented data to define, via a data window, a selected size of segmented data and generating in response window data, a data scoring unit for applying a second transformer type machine learning model to the window data and generating one or more probability scores associated with one or more portions of the window data, wherein the probability score is indicative of a likelihood that the one or more portions of the window data include the model-generated data, wherein the data scoring unit generates scoring data, a data highlight unit for receiving the scoring data and for highlighting one or more portions of the scoring data that includes the model-generated data, wherein the data highlighting unit generates highlighted data, and a final scoring unit for determining a final probability score of the highlighted data and generating final score data. The model source determination unit can be configured for determining, based on the final score data, the source of the model-generated data.

The first transformer type machine learning model can include a T5 based sequence-to-sequence model that can be trained on a dataset that comprises paired data that includes a raw text data and a corrected text data. The second transformer type machine learning model can be a BERT model. The data window defined by the shifting windowing function of the shifting window analysis unit has a selected window size corresponding to a plurality of sentences. The plurality of sentences can include at least a first sentence, a second sentence, and a third sentence, and the data scoring unit can determine a probability score associated with each of the first sentence, the second sentence, and the third sentence. The shifting windowing function shifts the data window by at least one sentence to form a new data window. The new data window can include at least the second sentence, the third sentence, and a fourth sentence, and the data scoring unit determines a probability score for each of the second sentence, the third sentence, and the fourth sentence in the new data window. Further, for each of the sentences that have multiple probability scores associated therewith, the data scoring unit can determine an average probability score for each of the sentences. The highlight unit can be configured to classify the scoring data into a plurality of selected scoring categories. The final scoring unit determines the final probability score by averaging the probability scores associated with each sentence in the highlighted data. Further, the model source determination unit applies a third transformer type machine learning model to the final score data for determining the source of the model-generated data based on the final score data.

The system can also include a human text determination unit for determining whether portions of the normalized data are human-generated data and to determine the source of the human-generated data. The human text determination unit employs a contextual similarity technique to determine the source of the human-generated data.

The present invention is further directed to a non-transitory, computer readable medium comprising computer program instructions tangibly stored on the computer readable medium, where the computer program instructions are executable by at least one computer processor to perform a method for processing input data and determining a source of model-generated data in the input data. The method includes preprocessing the input data to clean and normalize the input data and generating in response normalized data, detecting if the model-generated data is present within the normalized data, and determining, based on a final score data, the source of the model-generated data. The step of preprocessing can include cleaning the input data and generating cleaned data, tokenizing the cleaned data and generating tokenized data, mitigating bias present within the tokenized data by applying a first transformer type machine learning model thereto and then generating in response bias mitigated data, and normalizing the bias mitigated data and generating normalized data. The present invention is directed to a computer-implemented method for processing input data and determining a source of model-generated data in the input data. The method can be performed by at least one computer processor executing computer-readable instructions tangibly stored on at least one computer-readable medium comprising the steps of preprocessing the input data to clean and normalize the input data and generating in response normalized data, detecting if the model-generated data is present within the normalized data, and determining, based on the final score data, the source of the model-generated data. The step of detecting can include segmenting the normalized data into a discrete data segments using a tokenization technique and then generating segmented data, applying a shifting windowing function to the segmented data to define, via a data window, a selected window size of segmented data and then generating window data in response thereto, applying a second transformer type machine learning model to the window data and generating one or more probability scores based on the window data, wherein the probability score is indicative of a likelihood that the window data includes model-generated data, and then generating scoring data in response to the window data, highlighting one or more portions of the scoring data that includes the model-generated data, and then generating highlight data in response to the scoring data, and determining a final probability score based on the highlighted data and then generating final score data.

The computer readable medium can also include the steps of defining the data window to have a selected window size with the shifting windowing function, wherein the window size corresponds to a plurality of sentences, wherein the plurality of sentences includes at least a first sentence, a second sentence, and a third sentence, and determining a probability score associated with each of the first sentence, the second sentence, and the third sentence. Still further, the computer readable medium can include the step of shifting the data window by at least one sentence to form a new data window, wherein the new data window includes at least the second sentence, the third sentence, and a fourth sentence, determining a probability score for each of the second sentence, the third sentence, and the fourth sentence in the new data window, and determining whether portions of the normalized data are human-generated data by applying a contextual similarity technique and determining the source of the human-generated data.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

DETAILED DESCRIPTION OF THE INVENTION

Figure 1:
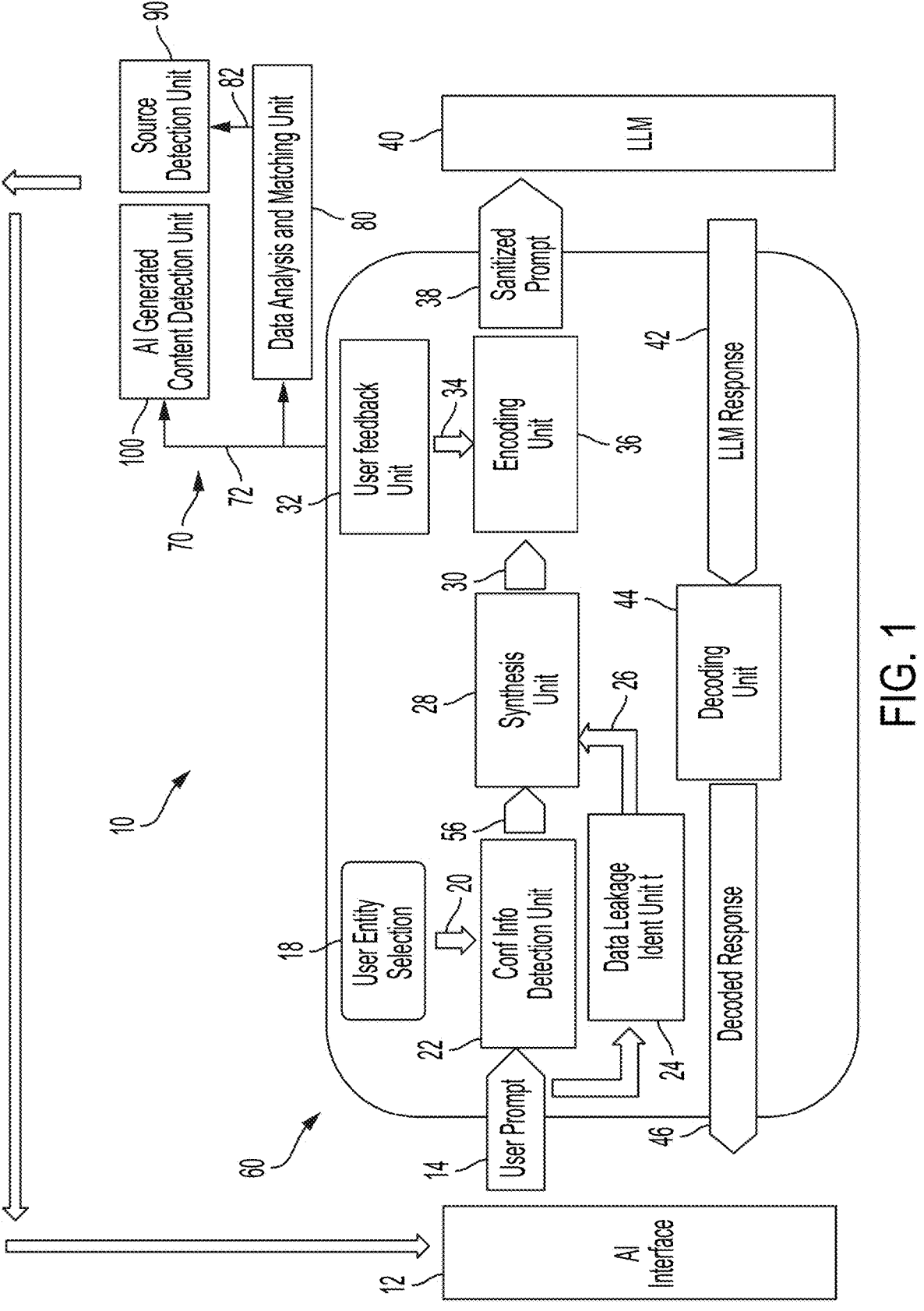
FIG. 1 is a schematic block diagram of one embodiment of a data identification system according to the teachings of the present invention.

As used herein, the term "enterprise" is intended to include all or a portion of a company, a structure or a collection of structures, facility, business, company, firm, venture, joint venture, partnership, operation, organization, concern, establishment, consortium, cooperative, franchise, or group or any size. Further, the term is intended to include an individual or group of individuals, or a device or equipment of any type.

As used herein, the term "confidential information" is intended to include any type of sensitive and confidential information that requires or would benefit from being protected from purposeful or accidental dissemination or disclosure. The information can include personally identifiable information, payment card history information, personal health data, proprietary code data, and business-related information. The personally identifiable information is information that can be used to identify an individual or a group of individuals or an enterprise. Examples of suitable identifiable information, such as personally identifiable information, can include name, address, phone number, social security number (SSN), information, passport information, health related information, biometric related information, financial information, sensitive personal information, and the like. The sensitive personal information can refer personal information that is considered particularly private and if disclosed can result in harm to the individual. This type of information can include, in addition to the above, sexual orientation information, race and ethnicity related information, religious information, political information, legal related information including criminal history information, and the like. The payment card history information refers to an individual or an enterprises history of using payments cards, such as credit and debit cards, information related to transactions, account balances, and other related data, credit limit information, merchant information, and the like. The personal health information can refer to health related data associated with an individual. The proprietary software code information can refer to software code or applications that are owned by a particular individual or enterprise and are not freely available. The business-related information can refer to important information associated with the operation, governance, sales, and finances of a business. Examples of types of business information an include product and services sales information, customer information, marketing information, enterprise operational information, intellectual property related information, legal and regulatory information, technology infrastructure information, and the like.

As used herein, the term "financial data" can include any data that is associated with or contains financial or financial related information. The financial information can include information that is presented free form or in tabular formats and is related to data associated with financial, monetary, or pecuniary interests. Further, as used herein, the term "non-financial data" is intended to include all data, including if appropriate environmental data, that is not financial data as defined herein.

As used herein, the term "health data" or "health-related data" includes any type of data related to the scheduling, delivery, and application of healthcare related services to a person, such as a patient, and to healthcare related claims and associated billing information. Examples of suitable types of data include patient encounter data (e.g., appointment data and schedule data), medical data, registration data, demographic data, psychological and mental related data, medication related data, radiological data, test and laboratory result data, dental related data, disease related data, medical provider data including the type of healthcare provider, prescription data, immunization data, genetics related data, body measurement related data (e.g., height, weight, blood pressure, and the like), referral related data, climate and pollution or emission related data, insurance related data, billing data, information created or generated by healthcare professionals, data from monitoring devices such as wearable and non-wearable devices, revenue data associated with the delivery of health services, and the like. The health-related data can be provided in any selected form or format and can be stored in any type of storage medium and format and is typically provided as part of an electronic health record.

As used herein, the term "machine learning" or "machine learning model" or "model" is intended to mean the application of one or more software application techniques that process and analyze data to draw predictions, inferences and/or recommendations from patterns in the data. The machine learning techniques can include a variety of artificial intelligence (AI) and machine learning (ML) models or algorithms, including supervised learning techniques, unsupervised learning techniques, reinforcement learning techniques, knowledge-based learning techniques, natural-language-based learning techniques such as natural language generation and natural language processing models including generative language models, deep learning techniques, and the like. The machine learning techniques are trained using training data. The training data is used to modify and fine-tune any weights associated with hyperparameters of the machine learning models, as well as record ground truth when correct answers can be found within the data. As such, the better the training data, the more accurate and effective the machine learning model. The supervised learning models can be trained on labeled datasets to learn to map input data to desired output labels. This type of learning model can involve tasks like classification and regression. The unsupervised learning model involves models that analyze and identify patterns in unlabeled data. Clustering and dimensionality reduction are common tasks in unsupervised learning. The semi-supervised learning models combine elements of both supervised and unsupervised learning models, utilizing limited labeled data alongside larger amounts of unlabeled data to improve model performance. The reinforcement learning model involves training models to make sequential decisions by interacting with a selected environment. The models learn through trial and error, receiving feedback in the form of rewards or penalties. The deep learning models utilizes neural networks with multiple layers to automatically learn hierarchical features from data. The neural networks can include interconnected nodes, or "neurons," organized into layers. Each connection between neurons is assigned a weight that determines the strength of the signal being transmitted. By adjusting these weights based on input data and desired outcomes, neural networks can learn complex patterns and relationships within the data. The neural networks can include, for example, feedforward neural networks (FNNs), convolutional neural networks (CNNs), recurrent neural networks (RNNs), long short-term memory (LSTM) networks, gated recurrent units (GRUs), autoencoders, generative adversarial networks (GANs), transformers, and large language models (LLMs). The large language models can be configured to understand and generate human language by learning patterns and relationships from vast amounts of data. The LLMs can utilize deep learning techniques, particularly transformer type models and architectures, to process and generate text. These models can be pre-trained on massive data corpora (e.g., text corpora) and can perform tasks such as text generation, language translation, text summarization, sentiment analysis, and the like. The LLMs can include generative artificial intelligence (AI) models. The transformer type model is in essence a deep learning model that employs a self-attention mechanisms to process selected input data in parallel, enabling it to capture complex relationships and dependencies across long sequences of data efficiently. The transformer model can include layers of self-attention and feedforward neural networks that are adept at handling tasks involving sequential data, including for example language translation, text generation, and image analysis. The self-attention mechanism allows the transformer model to dynamically analyze relevant parts of the input text sequence, while concomitantly facilitating context-sensitive understanding. The transformer model can employ an encoder-decoder architecture with multiple layers that include self-attention and feedforward component, and the model can also be configured to process input tokens simultaneously, The transfer learning model can involve training a model on one task and transferring its learned knowledge to a related task, often enhancing efficiency and performance. The ensemble learning model can combine multiple models to make more accurate predictions. Common techniques include bagging and boosting. The online learning model can be updated continuously as new data becomes available, making them suitable for dynamic environments. The instance-based learning model can make predictions based on the similarity between new instances and instances in the training data.

The machine-learning processes as described herein may be used to generate machine-learning models. A machine-learning model, as used herein, is a mathematical representation of a relationship between inputs and outputs, as generated using any machine-learning process including without limitation any process as described above and stored in memory. An input can be submitted to a machine-learning model once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model may be generated by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg- Marquardt, conjugate gradient, simulated annealing, or other algorithms) is then used to adjust the connections and weights between nodes in adjacent layers of the neural network to produce the desired values at the output nodes. This process is sometimes referred to as deep learning.

As used herein, the term "generative model," "generative AI model" or "generative language model" is intended to refer to a category of machine learning models that generate new outputs based on data on which the model has been trained. Unlike traditional models that are designed to recognize patterns in the input data and make predictions based thereon, the generative language models generate new content in the form of images, text, audio, hieroglyphics, code, simulations, and the like. The language models are typically based on large language models (LLMs) or deep learning neural networks, which can learn to recognize patterns in the data and generate new data based on the identified patterns. The language models can be trained with training data on a variety of data types, including text, images, and audio, and can be used for a wide range of applications, including image and video synthesis, natural language processing, music composition, and the like. Typically, generative language models can employ a type of deep learning model called a generative adversarial network (GAN) that includes two neural networks that work together to generate new data. The generative language model can also optionally employ recurrent neural networks (RNNs), which are a type of neural network that is often used for natural language processing tasks. The RNNs are able to generate new text by predicting the likelihood of each word given the context of the previous words in the sentence. The generative AI model can also optionally employ a transformer model, which is a type of neural network architecture that is often used for language modeling tasks. The transformer model is able to generate new text by attending to different parts of the input text prompt and learning the relationships between the parts. Variational autoencoders (VAEs) can also be used and are a type of generative language model that learns to represent the underlying structure of a dataset in a lower-dimensional latent space. The model then generates new data points by sampling from this latent space. Deep convolutional generative adversarial networks (DCGANs) can also be employed and are a type of GAN that uses convolutional neural networks to generate realistic images. The DCGAN model is commonly used for image synthesis tasks, such as generating new photos or realistic textures.

In the present disclosure, data used to train a machine learning model can include data containing correlations that a machine-learning process or technique may use to model relationships between two or more types or categories of data elements ("training data"). For instance, and without limitation, the training data may include a plurality of data entries, each entry representing a set of data elements that were recorded, received, and/or generated together. The data elements may be correlated by shared existence in a given data entry, by proximity in a given data entry, or the like. Multiple data entries in the training data may evince one or more trends in correlations between categories or types of data elements. For instance, and without limitation, a higher value of a first data element belonging to a first category or types of data element may tend to correlate to a higher value of a second data element belonging to a second category or type of data element, indicating a possible proportional or other mathematical relationship linking values belonging to the two categories. Multiple categories of data elements may be related in training data according to various correlations, and the correlations may indicate causative and/or predictive links between categories of data elements, which may be modeled as relationships such as mathematical relationships by the machine-learning processes as described herein. The training data may be formatted and/or organized by categories of data elements, for example by associating data elements with one or more descriptors corresponding to categories of data elements. As a non-limiting example, training data may include data entered in standardized forms by persons or processes, such that entry of a given data element in a given field in a given form may be mapped or correlated to one or more descriptors of categories. Elements in training data may be linked to descriptors of categories or types by tags, tokens, or other data elements. For example, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively, or additionally, the training data may include one or more data elements that are not categorized, that is, the training data may not be formatted or contain descriptors for some elements of data. Machine-learning models or algorithms and/or other processes may sort the training data according to one or more categorizations using, for instance, natural language processing algorithms, tokenization, detection of correlated values in raw data and the like. The categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name or other types of data may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by the electronic device 300 may correlate any input data as described in this disclosure to any output data as described in this disclosure.

As used herein, the term "small language model" is intended to refer to a machine learning model, such as a natural language processing (NLP) model, that employs a relatively small number of adjustable or tunable parameters. The number of parameters can range from a few to a few million parameters. The parameters can be adjusted or tuned by training the model on training data, which can assign weights to neuronal connections in the model. The weights determine the strength and nature of the connections by minimizing the difference between a predicted output and target values from the training data, thus allowing the model to be suitably configured to handle a specific task.

As used herein, the term "data object" can refer to a location or region of storage that contains a collection of attributes or groups of values that function as an aspect, characteristic, quality, entity, or descriptor of the data object. As such, a data object can be a collection of one or more data points that create meaning as a whole. One example of a data object is a data table, but a data object can also be data arrays, pointers, records, files, sets, and scalar type of data.

As used herein, the term "attribute" or "data attribute" is generally intended to mean or refer to the characteristic, properties or data that describes as aspect of a data object or other data. The attribute can hence refer to a quality or characteristic that defines a person, group, or data objects. The properties can define the type of data entity. The attributes can include a naming attribute, a descriptive attribute, and/or a referential attribute. The naming attribute can name an instance of a data object. The descriptive attribute can be used to describe the characteristics or features or the relationship with the data object. The referential attribute can be used to formalize binary and associative relationships and in referring to another instance of the attribute or data object stored at another location (e.g., in another table). When used in connection with prompts for use with a generative language model, the term is further defined below.

The term "application" or "software application" or "program" as used herein is intended to include or designate any type of procedural software application and associated software code which can be called or can call other such procedural calls or that can communicate with a user interface or access a data store. The software application can also include called functions, procedures, and/or methods.

The term "graphical user interface" or "user interface" as used herein refers to any software application or program, which is used to present data to an operator or end user via any selected hardware device, including a display screen, or which is used to acquire data from an operator or end user for display on the display screen. The interface can be a series or system of interactive visual components that can be executed by suitable software. The user interface can hence include screens, windows, frames, panes, forms, reports, pages, buttons, icons, objects, menus, tab elements, and other types of graphical elements that convey or display information, execute commands, and represent actions that can be taken by the user. The objects can remain static or can change or vary when the user interacts with them.

As used herein, the term "electronic device" can include servers, controllers, processors, computers including client devices, tablets, storage devices, databases, memory elements and the like. The electronic device can include processors, memory, storage, display devices, and the like.

The governance system of the present invention enables an enterprise to harness the exponential potential of artificial intelligence (AI) while ensuring data privacy and minimizing and preventing data breaches and data leaks. The governance system can be deployed as a Software as a Service (SaaS) solution and is intended for enterprises to protect sensitive and confidential information from exposure to commercial AI tools and products that are used by employees.

FIG. 1 illustrates a data identification system 10 that employs a data governance subsystem 60 and a data source detection subsystem 70. The data governance subsystem 60 allows an enterprise to automatically identify and protect confidential information generated or stored within the enterprise. The illustrated data governance subsystem 60 can include a user interface generator for generating one or more user interfaces 12 that enable or allow a system user to provide instructions to the system via one or prompts 14. The data governance subsystem 60 can also include a user entity selection unit 18 for prompting the user to specify a type or specific instance of confidential information (e.g., entity) that the user desires to protect. The entity can be selected from a predetermined list of entities. The entity list can encompass a range of types of confidential information, such as, by simple way of example, names, addresses, zip codes, social security numbers, credit card numbers, email addresses, URLs, dates and times, driver's license numbers, passport numbers, nationalities, medical license numbers, PO Box information, bank account information, IP addresses, API keys, reference numbers, salary information, and the like. The user entity selection unit 18 can generate entity data 20.

Figure 2:
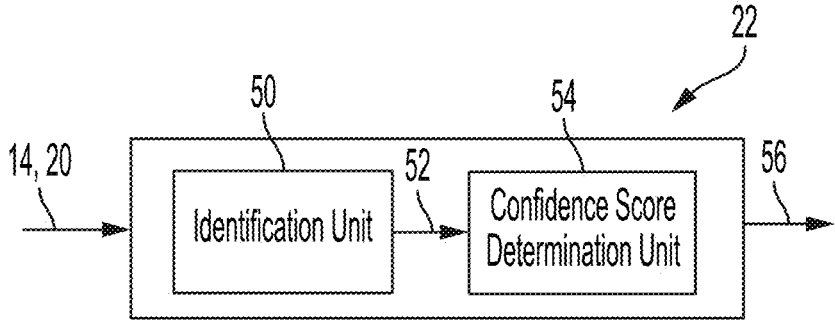
FIG. 2 is a schematic block diagram of a detection unit of the data identification system of FIG. 1 according to the teachings of the present invention.

As shown in FIGS. 1 and 2, the entity data 20 and the user prompt data 14 can be conveyed to and processed by a confidential information detection unit 22. The confidential information detection unit 22 can employ an identification unit 50 for applying a machine learning model, such as a natural language processing model, to the received user prompt data 14 and the entity data 20 to detect the selected entities (e.g., data types) in the user prompt data 14. For each entity identified in the prompt data 14, the NLP model determines the type of entity. The identification unit 50 can then generate entity type data 52 that is conveyed to a confidence score determination unit 54 for determining a confidence score associated with each entity in the entity type data 52 based on the entity type data 52. The confidence score determination unit 54 in essence assesses the reliability, accuracy, and quality of the entity type data 52 and generates a confidence value indicative of the accuracy of the data. The confidence score determination unit 54 then determines a confidence score associated with the identified entity type. The confidence score is then compared with a threshold confidence score, and if the determined confidence score is greater than the threshold confidence score or value, then the confidence score is passed along for further processing by the data governance subsystem 60. The confidence score determination unit 54 can employ one or more of a regular expression technique and a checksum technique to identify patterns in the data. For example, the regular expression technique (e.g., regex) can be employed to perform pattern matching within data strings. The regular expression technique defines and locates specific patterns in the data. For instance, passport numbers typically follow a format of two uppercase letters followed by six numbers or digits, thus making the regular expression technique a valuable tool for identifying this type of pattern in the data. In addition to adhering to a specific data pattern, valid IDs for example may also incorporate mathematical relationships between digits, known as a checksum technique. The checksum technique is in essence an error-checking technique and can, for example, add a calculated value to the original input data. The calculated value can be used to check the integrity of the received data and to determine if any errors exist in the transmitted data. When the checksum calculation aligns with the expected value of the data, hen the data is valid. Otherwise, it indicates a potential error.

Upon identifying an entry in the text data that matches the pattern of a specific entity type and passes the checksum test (if applicable), the confidence score determination unit 54 assigns a base confidence score to the data. The confidence score can be contingent on the uniqueness and exclusivity of the identified pattern, providing a systematic approach to validating and scoring potential data entities. For example, a string of 16 digits (possibly separated into groups of 4 digits) has a higher chance of belonging to the category "credit card number" compared to a string of 12 digits belonging to the category "bank account number", and hence having a higher confidence score. In addition to the base confidence score, the confidence score determination unit 54 can increase the detection confidence based on the surrounding words in the data string. For example, if the confidence score determination unit 54 determines that the previously mentioned 12-digit string is surrounded by bank-related words, then the confidence score determination unit 54 can increase the base confidence score to develop an enhanced confidence score by a calculated or predetermined amount. Further, the confidence score determination unit 54 can consider the context provided by the surrounding data string (e.g., words). For example, if the identified 12-digit string is located within the context of bank-related words, then the confidence score determination unit 54 can further increase the enhanced confidence score by a further specific amount. This methodology employed by the confidence score determination unit 54 leverages the contextual information to enhance the reliability of the overall data identification process. The confidence score determination unit 54 generates confidence score data 56.

As shown in FIG. 1, the illustrated data governance subsystem 60 also includes a data leakage identification unit 24 for receiving the user prompt data 14. The data leakage identification unit 24 identifies whether the user prompt data 14 includes or is related to specific types of confidential information, such as, by simple way of example, software code and selected types of business information, such as contract information. The data leakage identification unit 24 identifies the presence of these types of confidential information in the prompt data 14 and then requests the user to confirm whether the user wishes to proceed with the data submission, recognizing that the content is confidential, regardless of the specific entities involved. If the user chooses to proceed, then the data leakage identification unit 24 identifies or detects the types of entities contained within the user prompt data 14. According to one practice, the data leakage identification unit 24 can apply a classification technique, such as a logistic regression model, to identify whether the identified entity in the user prompt data 14 belongs to one or more selected categories of confidential data. The logistic regression model can be trained or pre-trained on specific types of training data, such as for example on training data associated with software code and contract language. Specifically, the logistic regression model can be trained on a diverse dataset consisting of text paragraphs encompassing code snippets, contract pages, and general news articles. The data leakage identification unit 24 then generates category data 26.

The category data 26 and the confidence score data 56 is then received and processed by a synthesis unit 28. The illustrated synthesis unit 28 generates and replaces the confidential information (e.g., entities) with synthetic alternatives that serve as substitutes to the entities identified in category data 26. The synthetic alternatives correspond to artificially generated data that serves as a substitute for the categorized entities (e.g., confidential information). For example, if the name "Joseph Walker" is detected in the category data 26, the synthesis unit 28 replaces the name with a synthetic alternative, such as with a randomly generated name like "David Johnson". The synthesis unit 28 handles both the substitution of the original entity with the proposed synthetic entity to ensure that the categorized entity, corresponding to the original input prompt data, is not revealed or exposed. The synthesis unit 28 can also be configured to revert back to the original entity data by removing the synthetic alternatives. The synthesis unit 28 can employ a data anonymization technique, a privacy-preserving machine learning technique, or generative machine learning models to generate the synthetic data. The synthesis unit 28 guarantees that the original entities remain securely on the user device, while still yielding the same outcome as if the user had submitted the original confidential information. By further way of example, for entities such as names, the synthetic name can be generated by the synthesis unit 28 by selecting a random entity from a predefined pool or list of names. In the case of date/time/day entities, a random date/time/day can be generated by the synthesis unit 28. For other entities such as passport numbers, the synthesis unit 28 can introduce random changes to both numbers and letters. For example, an original passport number such as A12345678 can be substituted with Z97090667, while maintaining the same format as the original data. The synthesis unit 28 can then generate synthetic data 30.

The data governance subsystem 60 can further include user feedback unit 32 that allows the user to decide how to handle the synthetic data 30. For example, the user has the option to either utilize the generated synthetic data 30, request that new synthetic data be generated, or, if the user has the requisite access permission level, the user can override the synthetic data 30 and proceed with the original entity data (e.g., category data 26). The user feedback unit 32 generates decision data 34.

The data governance subsystem 60 also includes an encoding unit 36 for receiving and processing the decision data 34 and the synthetic data 30. The encoding unit 36 can replace the entity data with the synthetic data when the decision data requests the data replacement. The encoding unit 36 can then generate encoded data 38 that corresponds to a sanitized prompt devoid of any confidential information. Additionally, the encoding unit 36 maintains a secure record of the one-to-one correspondence between the original and synthetic entities, which is needed for the subsequent decoding stage. The encoded data 38 can be conveyed to a machine learning model 40, such as a large language model, for further processing so as to generate model data 42. The LLM model can be any selected machine learning tool that the user can interact with, such as chatbots, text generative models, conversational agents, and the like. For example, the user prompt can start with "write a response to this email indicating . . . " followed by the email the user has received. Then the synthetic data 30 (e.g., sanitized prompt) can include the same request, except that the confidential information in the email body is replaced with synthetic data. Then the LLM can generate a response to the email/prompt in the form of model data 42, except that some of the synthetic entities appear in the response, making it not usable for the user in that form.

The data governance subsystem 60 further includes a decoding unit 44 for receiving and processing the model data 42 and for decoding the model data 42 to form decoded response data 46. The decoding unit 44 can turn the model data 42 into a user ready response. When the LLM 40 generates the model data 42 in response to the synthetic data, the LLM 40 can include some of the synthetic entities, rendering the result unsuitable for direct use by the user. The governance system 10 can transform the model data 42 with the decoding unit 44 into the decoded response data 46. The decoding unit 44 can decode the synthetic data in the model data 42 by reverting the synthetic entity back to the original entity data form. The decoding is done by using an encoding table achieved employed by the encoding unit 36. There is a one-to-one correspondence between the original data entities provided by the user and the synthetic entities generated by the synthesis unit 28 and confirmed by the user via the user feedback unit 32 and contained within the decision data 34. The decoding unit 44 can then generate decoded data 46 that is representative or indicative of the original user prompt data 14. The final decoded response is then prepared for immediate use by the user, eliminating the need for any further adjustments.

In the data governance subsystem 60, one or more of the confidential information detection unit 22, the data leakage identification unit 24, the synthesis unit 28, the encoding unit 36 and the decoding unit 44 can employ a small language model. The small language model can employ the NLP training and learnings to identify confidential data (default and/or selected) in the prompt data and flag or mark the confidential data for encoding/scrambling/masking and the like. Subsequently, the small language model can identify the encoded material when the prompt is returned and decode/unscramble/unmask the encoded data.

The small language model can be configured to specialize in confidentiality information such as personal information, financial information, health data, usernames, passwords, API keys, proprietary codes, data types, and metadata attributes. In case of any confidential data risk, the user receives a notification before the query is submitted to an AI/LLM solution. Once the synthesis unit 28 identifies the confidential information, the entity data can be replaced with the synthetic alternatives. Further, the data can be encrypted using known data encryption techniques, such as via AES-256-bit encryption or scrambles the data through interpolation, shuffling, tokenization, and the like, making the data operable with machine learning models. The governance system can be implemented as an engine on the user device, such that the original and encoded data never leaves the user's device.

The data governance subsystem 60 of the present invention provides for selected advantages. The advantages include an on-premises solution for grounding the data, and seamlessly passes encrypted/masked data to AI LLM systems including chatbots, recommendation engines, image generators, and the like. The subsystem 60 also provides for, upon response generation, requesting the user to decrypt or unmask the content (e.g., model data). From there on, the AI-generated content can be updated with the actual data on the user-facing interface, and ready to be copied and used. The on-premises installation can be on electronic devices and servers. agent-based or proxy-based network deployment options, and the like. The subsystem can provide for dashboards for tracking data leakage/breach risks, and display AI usage analytics. This includes trend analysis of leaked data types, users, timing, and applications. Granular policy and usage audit logs.

The illustrated data identification system 10 can also include a data source detection subsystem 70 that can be configured to identify and determine the source of selected data. Specifically, the data source detection subsystem 70 can be employed to identify selected data and to determine if the data has been generated by one or more publicly available machine learning models, such as large language models, and can be further configured to determine and assign a trust score value to the identified data. The data can include text, images, OCR data, audio data, and the like. If the data source detection subsystem 70 identifies data that is most likely created by the ML model, the subsystem also traces or tracks the original content, if any, that was used as source material that was input into the ML model that created the content being analyzed. As such, the data source detection subsystem 70 is also able to perform a plagiarism check on the content that is being analyzed. The data source detection subsystem 70 can be employed to analyze and assess data to determine the authenticity of the digital content, thus helping creators, educators, and enterprises maintain or determine the integrity of the identified data.

The user feedback unit 32 allows the user to decide how to handle the synthetic data 30 or allows the user to import data into the data source detection subsystem 70. The imported data 72 is received and processed by a data analysis and matching unit 80. The illustrated data analysis and matching unit 80 analyzes the imported data 72 by comparing the data with available resources, such as pre-stored data, in order to identify any resemblances or matches between the imported data and stored data. The data analysis and matching unit 80 can initially segment the imported data 72 into segments or section (e.g., paragraphs). Then using a search API, the data analysis and matching unit 80 can search each paragraph to find similar content on the Internet, including the uniform resource locator (URL) (e.g., web address) associated with the data. The data analysis and matching unit 80 can then measure the similarity of the segment (e.g., paragraph) with the resulting URLs using an n-grams technique. For example, the n-grams technique can use a similarity metric, such as a cosine similarity or a Jaccard similarity, to quantify or determine the similarity of the data. The data analysis and matching unit 80 thus identifies instances where portions of the imported data 72 match, or closely match, content from other sources.

In the process of determining the level of similarity between the imported data 72 and the content of each URL, the data analysis and matching unit 80 dissects or segments the imported data using an NLP technique into n-grams. The n-grams can be a contiguous sequence of a specific number of n items (e.g., words) in the imported data 72. The NLP technique can determine the number of items (n-grams) in the sequence by passing a window of a selected size n over the imported data and the extracting the sequence of items within the window. This technique identifies and captures patterns and dependencies within the imported data. The data analysis and matching unit 80 can then sum together the instances where the n-grams appear in the respective URL. Consequently, the data analysis and matching unit 80 can identify, such as by highlighting the identified data in the imported data 72, that may potentially match or be similar to the online data. The data analysis and matching unit 80 can then determine a similarity score. The similarity score can be determined as a fraction of the n-grams that appear in the corresponding URL. Hence, a similarity score of 1 means that all the n-grams in the given piece of text also appear in the URL. The data source detection subsystem 70 can then generate a report, displayed via any suitable user interface, that includes the associated URL and its corresponding similarity score for each part of the imported data 72. The data analysis and matching unit 80 can then generate match data 82, which includes the identified data that matches the on-line data and if desired the similarity score.

The data source detection subsystem 70 can also include a source detection unit 90 for detecting the source of the identified data in the input data. Specifically, the source detection unit 90 can be configured to discern or determine whether the input text originates from the user (e.g., human) of from a model source, such as a large language model. Additionally, the source detection unit 90 can identify the most probable origin that contributed to the creation of this content. The match data 82 generated by the data analysis and matching unit 80 can include similarity score data, such as a matrix of similarity scores, where the similarity scores are determined between sections of the text (e.g., paragraphs) and online resources (URLs). However, the data source detection subsystem 70 does not want to return a different URL per paragraph. For example, if the input text data includes tens of pages of data which includes hundreds of paragraphs, it is more informative for the user to receive a few top sources which cover the majority of the text data. The source detection unit 90 can be employed to perform this task. The source detection unit 90 merges consecutive paragraphs that are determined to have a common URL within the top matched URLs contained in the match data 82. For example, if paragraphs 1 and 2 of the input text data have the highest similarity with URLs 1 and 2, respectively, and URL 1 is also within top similarity scores for paragraph 2 (e.g., top means within a pre-defined threshold compared to a maximum similarity score), then the source detection unit 90 reports URL 1 for both paragraphs and combines them together. This can go beyond 2 paragraphs, resulting in longer pieces of text reported to be taken from 1 source. Even in cases where the text data is generated by an ML model, there exists an underlying source that underpins the model response. The data source detection subsystem 70 can also include an artificial intelligence (AI) generated content detection unit 100 for detecting selected content within the input data 72. The AI generated content detection unit 100 can employ one or more models that are trained to identify data (e.g., text) produced by common machine learning models, such as GPT4, GPT-4o, Claude, Gemini, LLAMA, Mistral, and the like.

The models employed by the AI generated content detection unit 100 are trained on specific datasets, such as datasets encompassing both human-generated text and ML model responses produced by each respective model, in order to tune the models. For each portion of human-generated text forming part of the input text, the AI generated content detection unit 100 can be configured to retain the initial data sequence and can prompt the common ML models to extend the data sequence to a selected minimum number of words (e.g., 500 words). As such, the AI generated content detection unit 100 can obtain both human generated and ML model generated text on the same set of topics. With this type of comprehensive training, the models employed by the content detection unit 100 can make accurate predictions. The AI generated content detection unit 100 can utilize the original prompt data 14 or the imported data 72 (e.g., user's original text data) or the encoded data 38 (e.g., the sanitized post-confidential information redaction data). Each model provides a probability or similarity score indicating the likelihood that the given text data was generated by a corresponding ML model (e.g., large language model).

The data source detection subsystem 70 thus employs various techniques, such as marker identification, lack of factual consistency, grammatical perfection, and the like, that indicates that the data was generated by an ML model. These functions can be performed by the AI generated content detection unit 100.

The models employed by the content detection unit 100 can be trained similarly to transformer type ML models so that the model; can match the content patterns in the input data with known ML models to identify which model was used to create the content. For example, the models employed by the content detection unit 100 can be trained to identify data generated by the following ML models: GPT4, GPT-4o, Claude, Gemini, LLAMA, Mistral, and other types of human-generated content.

Further, the data source detection subsystem 70 enables the user to analyze data patterns in the input data to determine likely training data sources for generative content, such as news archives, books, Wikipedia, scientific research portals, social media, etc.

The data source detection subsystem 70 can thus be configured to analyze the input data to identify the source of the data, from among the common publicly available ML models, rather than detect specific instances of plagiarism.

The data source detection subsystem 70 has associated advantages and benefits to the user when employed. For example, the user can ensure that user-generated content and reviews are genuine, thereby enhancing consumer trust and loyalty. The user can combat misinformation and deep fake content and seamlessly and easily verify the origin of the content. The user can also curate content from various sources with confidence and can filter out content that may not align with selected authenticity standards.

Figure 3:
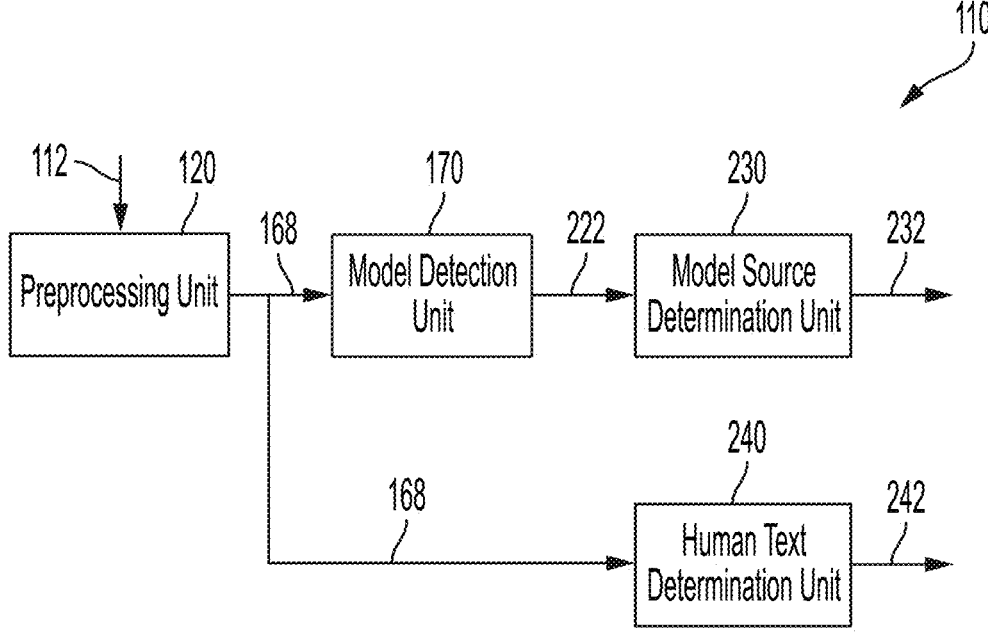
FIG. 3 is a schematic block diagram of another embodiment of the data identification system according to the teachings of the present invention.
Figure 4:
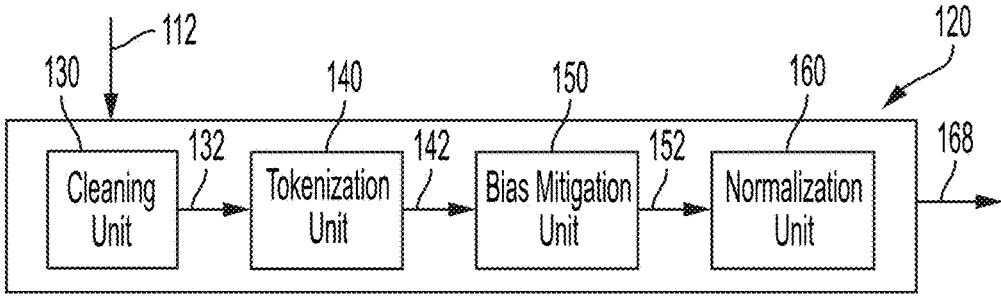
FIG. 4 is a schematic block diagram of the preprocessing unit of the data identification system of FIG. 3 according to the teachings of the present invention.
Figure 5:
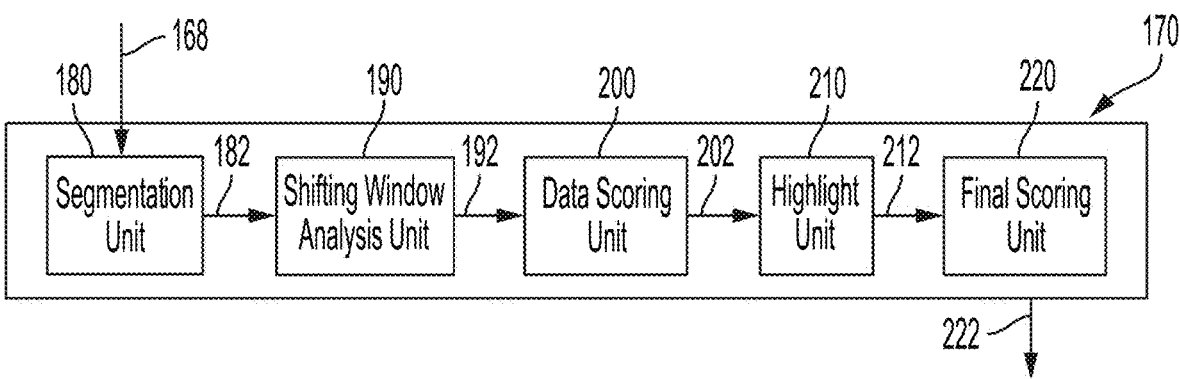
FIG. 5 is a schematic block diagram of the model detection unit of the data identification system of FIG. 3 according to the teachings of the present invention.

FIGS. 3-5 are schematic block diagrams of another embodiment of the data identification system of the present invention. The illustrated data identification system 110 is configured to allow a user to generate input data or provide input data to the system. The data can be provided to the system by any suitable input device. For example, the input device can be a suitable electronic device that can communicate and exchange information with the data identification system 110 either directly or via a network. The electronic device can be a client device, such as a computing or electronic device, that allows the user to access, interact with, and exchange data with the data identification system 110. The network can be any suitable network, such as a local area network (LAN), a wide area network (WAN), a metropolitan area network (MAN), a campus area network (CAN), a storage area network (SAN), a virtual private network (VPN), a wireless local area network (WLAN), or a home area network (HAN), that includes one or more electronic devices, such as one or more servers and other types of computing devices. The data identification system 110 allows the user to provide prompts and other types of input data via the client device, and over the network, that can then be processed by the system. The data identification system 110 as described herein can be configured to process the client or user input data and identify any portions of the input data that have been generated by a machine learning model. The input data can include one or more of text data, image data, video data, document data, and the like.

The data identification system 110 receives input data 112 generated or provided by the user and the input data 112 is received and processed by a preprocessing unit 120. The preprocessing unit 120 can preprocess the data by cleaning the data, addressing or correcting any biases that may reside in the data, and then normalizing the data. Specifically, the preprocessing unit 120 can include a data cleaning unit 130 for enriching and cleaning the input data 112. As used herein, the term "enrich," "enriching," or "enriched" is intended to include the ability to ingest and integrate data, and optionally apply logic and structure to the data so as to curate or correct the data. As used herein, the terms "data cleaning," "cleaning," and "clean" include the process of detecting and correcting or removing corrupt, inaccurate, or duplicate records from data, such as for example from a record set, table, or database by identifying incomplete, incorrect, inaccurate, or irrelevant parts of the data and then replacing, modifying, or deleting the original, raw, dirty or coarse data. The inconsistencies detected or removed by the data cleaning unit 130 may have been originally caused by user entry errors, by corruption in transmission or storage, or by different data dictionary definitions of similar entities located in different data stores. The data cleaning unit 130 can then generate cleaned data 132.

The cleaned data 132 can be conveyed to a tokenization unit 140 for tokenizing the cleaned data 132 or generating tokens based on the cleaned data. Tokenization is the process of breaking down, reducing, or splitting data, such as text or other sequential types of data, into smaller units, known as tokens, which can then be used as inputs to a machine learning model. The token can be a sequence of characters that represents a basic unit of meaning. Examples of tokens can include a word, subword, characters, punctuation marks, and the like, depending on the tokenization method employed. Examples of suitable tokenization methods can include whitespace tokenization, word or subword tokenization, sentence tokenization, and the like. The tokenization unit 140 can generate token or tokenized data 142, which can include one or more of the tokens, token IDs, attention mask data, and the like.

The token data 142 can be conveyed to and processed by a bias mitigation unit 150 for mitigating bias present within the tokenized data 142, and hence within the input data. As used herein, the term "mitigating" or "mitigate" bias is intended to refer to or mean identifying, adjusting, re-weighting, correcting, removing, or reducing data that is deemed to include biased data. As used herein, the term "bias" is intended to mean or refer to a systematic deviation or prejudice in favor of or against a thing, person, group, or enterprise, which can result in unfair, inaccurate, or unbalanced outcomes. In a data analytics context, the term can refer to systematic errors or unfair patterns in data processing or model outputs that disproportionately affect certain things, persons, or enterprises, leading to inaccurate, unfair, or unrepresentative results. The bias mitigation unit can work to detect and reduce bias in order to ensure that the analysis or predictions remain objective, fair, and equitable. The bias mitigation unit 150 can thus be configured to mitigate (e.g., identify, adjust, or remove) biases related to sensitive or confidential data attributes (e.g., race, gender, age, and the like) that may lead to biased or skewed outcomes when processed by a machine learning model. More specifically, the bias mitigation unit 150 may process as part of the input data adversarial data that may be introduced thereto and that can deceive the data identification system 110. The adversarial inputs can include, for example, accidental or deliberate modifications to the data, such as typographical errors, grammatical errors, biased phrasing, or unusual punctuation, that can purposely or accidentally reduce the accuracy of the machine learning model. In order to mitigate this impact, the bias mitigation unit 150 can be configured to process the input data to remove such adversarial elements and to clean, tokenize, mitigate, and optionally normalize the data.

The bias mitigation unit 150 can employ a selected machine learning model to mitigate bias in the tokenized data 142. The machine learning model can be any selected type of transformer-type model, such as a Text-To-Text Transfer Transformer (T5) based sequence-to-sequence model (Google Research), which is a type of neural network model based on the T5 architecture. The model is configured to handle a wide range of natural language processing (NLP) tasks in a unified, text-to-text framework, where all inputs and outputs are represented as text. This text approach allows the T5 model to perform diverse processing tasks, such as for example translation, summarization, classification, question answering, sentiment analysis, and the like, within a single model architecture. The T5 model can be trained on a large, diverse dataset to assist the model in learning language patterns and contextual information. More specifically, the T5 model can be trained to transform the adversarial modified text into cleaner text, thus improving the reliability of the machine learning model. The model operates by translating biased, erroneous, or adversarial text into its corrected form through supervised learning on large datasets. The training process can include collecting and curating datasets that include biased information, such as typographical errors, grammatical errors, and biased language. Each sample in the training dataset can include of a raw text and a corrected text pair. The datasets can also be used to fine-tune a pre-trained T5 model. The model can be trained to mitigate (e.g., correct) biases, grammatical mistakes, and other adversarial modifications by minimizing the loss between a predicted output and a ground-truth clean text. The T5-based sequence-to-sequence model can be trained to remove and/or correct any adversarial elements, such as by fixing typographical and grammatical errors, replacing biased language with neutral and fair language, and removing unnecessary or adversarial punctuation. The transformer type T5 model employed by the bias mitigation unit 150 can be described mathematically as:

$$T_{clean} = f\left(T_{raw}\right)$$

where $T_{raw}$ is the raw, unprocessed token text that can contain adversarial modifications, such as typographical errors, grammatical mistakes, and biased language. $T_{clean}$ can be the normalized, corrected text that is free of adversarial errors and biases, and $f\left(\cdot\right)$ is the function that performs adversarial correction, including typographical correction, grammar fixing, and bias removal. Thus, the T5 based model learns to transform the text $T_{raw}$ into a cleaner, mitigated, unbiased version $T_{clean}$. Each sample of data in the training dataset can include of a pair of raw text $T_{raw}$ and a corrected counterpart $T_{clean}$. The datasets are used to train and fine-tune the model. The bias mitigation unit can be configured to normalize the data and created normalized data 168. According to another embodiment, the data preprocessing unit 120 can employ a data normalization unit 160 that can process the mitigated data 152 generated by the bias mitigation unit 150 and then normalize the mitigated data. The normalization unit 160 can normalize the mitigated data 152 by processing the data and transforming the data into a common scale or format. By processing the data in this manner, the normalization unit 160 can make the data easier to compare and analyze or easier to be processed by a machine learning model. The mitigated data 152 can be normalized using various techniques, such as for example by a min-max technique, a Z-score standardization technique, a decimal scaling technique, a logarithmic transformation technique, a robust scaling technique, a max-abs scaling technique, and the like. The normalization unit 160 can generate the normalized data 168.

The normalized data 168 can be conveyed to and processed by a model detection unit 170 for detecting or identifying and then determining if the normalized data 168 includes either or both of human-generated text and model-generated text. The model-generated text refers to text that is generated a machine learning model. If the normalized data 168 includes model-generated data, then the model detection unit 170 can be configured to identify and score the model-generated data, and if desired highlight the data based on the assigned score. The illustrated model detection unit 170 can include a segmentation unit 180 for segmenting the normalized data 168 into a series of discrete data segments or textual data units. The data segments or units can include for example words, subwords (e.g., fragments or portions of words that represent smaller meaningful units or components), sentences, paragraphs, and the like. According to one embodiment, the segmentation unit 180 can break down, segment, or split the normalized data 168 into a series of data segments, such as sentences. The model detection unit 170 can employ a natural language processing technique, such as a tokenization technique, to segment or tokenize the normalized data 168 into a series of data segments (e.g., sentences). The tokenization technique can include a regular expression (regex) technique, a statistical model technique such as hidden Markov models and entropy models, a machine learning model such as an RNN or a transformer type model including a bidirectional encoder representations from transformer (BERT) model, and the like. The segmentation unit can then generate segmented data 182.

The segmented data 182 is then received and processed by a shifting window analysis unit 190. The shifting window analysis unit 190 can apply a shifting windowing function (e.g., a moving, sliding or rolling window) that generates a data window that can be applied or overlaid on to the segmented data 182 so as to process long sequences of data by dividing the data into defined, overlapping data segments or data chunks defined by the data window. The data segments defined by the data window of the shifting windowing function can define data segments of a selected size that are suitable for subsequent processing by a transformer type machine learning model, such as a BERT model, that processes data of a defined data length (e.g., 512 tokens). As such, the BERT model typically does not process longer data segments. The shifting windowing function helps divides the segmented data 182 into overlapping data segments that can be more easily processed by the model. The shifting windowing function can thus define the data window size as well as a data window stride (e.g., step size) that corresponds to the size or distance that the data window shifts for each new data segment. For example, a smaller data window stride value means more overlap between adjacent data segments defined by the data window and a larger stride value means less overlap between adjacent data segments. According to one embodiment, the shifting windowing function defines a data window size and stride that provides for preselected amount of data overlap. The shifting window analysis unit 190 then generates window data 192, which can include data chunks or segments.

The window data 192 is conveyed to and processed by a data scoring unit 200 for generating scoring data that is indicative of a probability that the window data includes model-generated data. The data scoring unit 200 can also apply a BERT machine learning model to the window data 192 to generate the scoring data. The present inventors have realized that the BERT model excels in understanding contextual nuances of text data. The BERT model operates by deeply encoding a window data (e.g., a sentence) in a bidirectional manner by considering both the preceding and succeeding context of a word within the sentence. Likewise, the BERT model considers both the preceding and succeeding sentence when considering the sentence. The bidirectional analysis employed by the model enables the model to grasp subtle semantic relationships and patterns that may be overlooked by conventional methods. The BERT model employs a self-attention mechanism, which allows the model to weigh the importance of each word relative to every other word in a sentence, regardless of the position of the word. The self-attention mechanism facilitates the detection of intricate data dependencies, ensuring that the model is sensitive to both local and global data context. The BERT model is hence able to understand deeper patterns of data coherence, style, and meaning across multiple sentences while providing a more robust assessment of text authenticity. The BERT model can be trained on training data that includes both model-generated text or data and human-generated text or data. For example, the BERT model can be trained on a large dataset that can be relatively equally split between model-generated text and human-generated text. The BERT model can then be tuned to enable the model to identify patterns or anomalies characteristic of model-generated text, such as over-regularized sentence structure or unnatural word choices.

Conventional artificial intelligence and machine learning detection techniques rely on surface-level heuristics, such as perplexity (e.g., a measure of how well a probabilistic model predicts text), burstiness (e.g., variability in writing style), readability scores, or other shallow statistical features. While conventional methods can sometimes identify simple model-generated text, the conventional models are limited in their ability to capture deeper linguistic or contextual anomalies. These conventional models also tend to fail when model-generated text becomes more sophisticated and begins to mimic human writing with greater precision.

In contrast, the transformer-based BERT model does not depend on manually engineered features. Instead, the BERT model can learn to extract complex, high-level representations of text, which can include syntactic patterns, semantic nuances, and long-range dependencies, that can reveal more subtle signs of model generation, such as inconsistencies in tone, style, or meaning coherence that statistical features may miss. Additionally, since the BERT model operates at a defined size of data segments (e.g., sentence), the model can detect contextually inappropriate word usages that would otherwise evade detection by conventional models, namely, by not relying on perplexity or burstiness metrics alone. As such, the bidirectional attention employed by the BERT model allows the model to evaluate a word or phrase in the context of the entire sentence or paragraph, which is important for identifying nuanced discrepancies in model-generated text. Also, since transformer models do not rely on surface-level features, the transformer models are harder to fool by increasingly sophisticated machine learning systems that can mimic perplexity and burstiness patterns similar to human-generated text. Further, the BERT model can be fine-tuned with updated data, including newer generations of model-generated text, making the model more adaptable to evolving model generation techniques. This adaptability surpasses conventional feature-based models, which require manual recalibration as AI/ML techniques advance. By understanding context and meaning, the BERT model can recognize semantic incongruities that may arise from model-generated content, where traditional models miss such fine-grained textual issues.

The shifting window analysis unit 190 can employ a fixed or dynamic data window of a selected size and stride for analyzing portions of the segmented data. The data portions within the data window can overlap with data in other windows or can be employed so that the data is not overlapped. According to one embodiment, the data window is a fixed size window of about three sentences in size. The data window is slidable or shiftable and is overlaid or applied to the segmented data 182 in three sentence chunks or segments that can overlap. For example, and for purposes of clarity, the slidable data window can define of include sentences S1, S2, S3 of the segmented data 182, and the data window can be slid or shifted to overly sentences S2, S3, S4, and then the data window can be further slid or sifted to overly sentences S3, S4, S5. As such, the sentence S3 is included in three separate data windows when the window is slid or shifted one sentence at a time. Those of ordinary skill in the art will readily recognize that the data window can be slid in greater than single sentence chunks. The data scoring unit 200 can be configured to generate a probability or confidence score for each sentence in the window data 192 that is indicative or representative of whether the sentence includes model-generated text. The data scoring unit 200 can employ the BERT model to determine the probability score. Since the sentences in each window are processed by the data scoring unit 200, it is anticipated that at least most of the sentences in the window text 192 are scored more than once.

Specifically, and by simple way of example, given the text T representative of the normalized data 168, the data is reduced, segmented, or tokenized into data subunits, such as sentences. The segmented data is represented as:

$$T = \{S_1, S_2, \ldots S_n\}$$

where Si is an integer representing the i-th sentence in the normalized data 168 and n is representative of the total number of sentences in the normalized data. The shifting window analysis unit 190 can be configured to process the segmented data 182 and define a data window of a selected data size. According to one embodiment, the window size can cover or overly three sentences and the window is shiftable by a selected amount, such as for example, by one sentence. Those of ordinary skill in the art will readily recognize that the window shift can be for any data size. As such, the window size W is shiftable or movable along the text in selected data chunks of size w, such as w=3. Let $S_i$ denote the chunk of text starting at sentence $s_i$:

$$S_i = \{s_i, s_{i+1}, \ldots, s_{1+w-1}\}$$

For each data chunk $S_i$, the data scoring unit 200 can calculate or determine the probability score $P_1$ using the BERT model, such that:

$$P_1 = P(S_1)$$

where P represents the function that predicts whether the data is human-generated data or model-generated data for the given data segment, and $P_1$ represents the likelihood that the data chunk $S_1$ is model-generated.

The sliding window of the shifting window analysis unit 190 ensures that each sentence is scored multiple times, as a selected sentence can appear in different windows indicative of different data chunks. For example, sentence $s_i$ can appear in chunk $S_i$, but the sentence can also appear in data chunk $S_{i-1}$ or $S_{i+1}$, depending on the sentence position in the text. To aggregate the probability scores for each sentence, the data scoring unit 200 can determine an average of all the probability scores associated with each sentence. For example, Let $P_{i,j}$ represent the probability score of sentence $s_i$ when the sentence appears in data chunk $S_i$ (e.g., a window). The aggregated score $P_J$ for sentence $S_i$ is computed as:

$$\overline{p_J} = \frac{1}{|C_j|} \sum_{i \in C_j} p_{i,j}$$

where $C_j$ is the set of indices i such that $s_j \in S_i$, and $|Cj|$ is the number of times the sentence $s_i$ appears in the data chunks in the window. The data scoring unit 200 can then determine the probability score for each sentence in the window, and for sentences that reside in multiple windows, an average of the probability scores for the sentence are determined. The data scoring unit 200 can then generate scoring data 202, which can include the text data and associated scoring information.

The scoring data 202 can be received and processed by a data highlight unit 210. The illustrated data highlight unit 210 can be configured to optionally classify the scoring data 202 into selected scoring categories and to highlight selected portions of the scoring data that includes model-generated data. As used herein, the term "highlight" is intended to refer to marking or visually distinguishing one or more portions of the data for subsequent display to the user by altering the appearance of the data. The alteration to the data can include changes in color, brightness, size, emphasis, font style, or the addition of visual markers such as underlining, outlining, bolding, or shading, to draw attention to specific portions of the data, thus making the data easily identifiable to the user. Specifically, once the average probability score $P_J$ is computed by the data scoring unit 200 for each sentence in the window data, the data highlight unit 210 can be configured to classify the scoring data and then highlight one or more sentences of the data that includes model-generated data. According to one embodiment, based on the probability score $P_J$, the data highlight unit 210 can assign a color to each sentence to visually represent the likelihood that the sentence includes model-generated content. The data highlight unit 210 can employ any selected type of highlighting scheme, such as, for example, assigning color to selected portion of the data. According to one embodiment, the data highlight unit 210 can use any selected type and number of colors when highlighting the data. According to one illustrative example, the data highlighting unit 210 can be configured to employ the colors red (Color 1), yellow (Color 2), and white (Color 3) to highlight selected portion of the data. The highlight colors can be employed when the probability scores for each sentence are below, between, or exceed selected threshold scores. The data highlight unit 210 can be configured to employ any selected number of thresholds depending upon the number of colors employed by the data highlight unit. According to one example embodiment, the red highlight color can be used to highlight selected sentences when the probability scores of the sentences exceeds a selected probability score threshold, such as for example when $p_j \geq 0.70$, indicating a high likelihood of model-generated content being in the highlighted sentences. The yellow highlight color can be used when the probability scores of selected sentences falls between multiple selected probability score thresholds, such as for example when $0.55 \leq p_j < 0.70$, indicating a moderate likelihood of model-generated content being in the highlighted sentences. The white highlight color can be used to highlight selected sentences when the probability scores of the sentences is below a selected probability score threshold, such as for example when $p_j < 0.55$, indicating a low likelihood of model-generated content being in the highlighted sentences. The example color assignment can be set forth as:

$$\text{color } (s_j) = \begin{cases} \text{Color 1 if} & \overline{p_j} \geq 0.70 \\ \text{Color 2 if} & 0.55 \leq \overline{p_j} < 0.70 \\ \text{Color 3 if} & \overline{p_j} < 0.55 \end{cases}$$

The data highlight unit 210 can generate highlighted data 212. The highlighted data 212 can optionally be received and processed by a final scoring unit 220 for generating an overall or final probability score of each data subunit (e.g., sentence) of the input normalized text 168. After the model detection unit 170 determines the probability scores of each sentence, as well as the accumulated average probability score associated with each sentence that has been scored multiple times, the data highlight unit 210 can highlight selected portions of the data, and the final scoring unit 220 can determine or calculate an overall or final probability score for the normalized data 168 by averaging the probability scores for most or all of the sentences in the normalized data 168 and hence the scoring and highlighted data. The overall or final probability score $P_F$ can be determined as follows:

$$P_F = \frac{1}{n} \sum_{j=1}^{n} \overline{p_j}$$

The overall or final probability score $P_F$ can then be used to determine the proportion of model-generated data versus human-generated data in the input data. The human-generated probability score $P_H$ can be determined as follows:

$$P = 1 - P_F$$

The probability scores of selected sentences or the final probability score of the scoring or highlighted data can provide a global assessment of the input data 112, while the color-coded highlighting of the scoring data offers localized insights into which portions of the scoring data correspond to model-generated data. By simple way of example, suppose the normalized data 168 includes six sentences, and the shifting window analysis unit 190 can employ a data window size of three sentences (e.g., window size w=3). The data scoring unit 200 can then determine probability scores for the following data chunks defined by the shiftable or movable window. The data chunks or segments can be:

$$S_1 = \{s_1, s_2, s_3\}$$
$$S_2 = \{s_2, s_3, s_4\}$$
$$S_3 = \{s_3, s_4, s_5\}$$
$$S_4 = \{s_4, s_5, s_6\}$$

The data scoring unit 200 can aggregate the scores for each sentence across the overlapping data chunks. For example, sentence s3 can have three probability scores from S1, S2, and S3. The data scoring unit 200 then determines an average probability score for each sentence. The average probability scores for each sentence can be used by the model detection unit to highlight the text and compute the overall or final probability score. The final scoring unit 220 can then determine a final probability score and generate final score data 222. Those of ordinary skill in the art will readily recognize that the BERT model employed by the model detection unit can be configured to perform the segmentation, windowing function, scoring and highlighting functionalities in a single model, such as a single transformer type model (e.g., BERT model), rather than be distributed across multiple different models.

The final score data 222 can be conveyed to and processed by a model source determination unit 230 that is configured for determining, based on the final score data, the model source that generated the model-generated data in the input data 168. The model source determination unit 230 can employ one or more machine learning models that can process the final score data 222 and then determine the model source based on the final score data. According to one embodiment, the model source determination unit 230 can employ a transformer-type machine learning model, such as a robustly optimized BERT approach (RoBERTa) model to initially process the final score data 222, and then classify the score data (optionally data that meets or exceeds a threshold score) into a series of classifications corresponding to selected types of machine learning models. For example, the model source determination unit 230 can classify and label the final score data 222 and sort or classify the data into a selected number of classifications or categories, such as for example Gemini model category, Claude model category, LLAMA model category, ChatGPT model category, Mistral model category, and the like. The assigned labels and hence categories can correspond to different large language models (LLMs) that are possibly responsible for generating the input data. The model source determination unit 230 can be configured to perform multi-class classification by implementing or utilizing a Softmax classification technique or layer with the transformer-based model. The Softmax classification layer can be, for example, a final layer in the RoBERTa model when used for classification tasks. The classification layer can convert the output of the model into a probability distribution over possible classes, thus allowing the model to select the most likely class for a given data input. The model's final prediction is thus the class with the highest probability. The RoBERTa model can be fine-tuned using labeled text or datasets generated by different machine learning models. For example, the input text $X = \{x_1, x_2, \ldots, x_n\}$ can be tokenized and passed through the RoBERTa model, generating contextual embeddings $E = \{e_1, e_2, \ldots, e_n\}$. The final hidden state of the CLS token (e.g., classification token) can be extracted and represented by:

$$h_{[CS} = RoBERTa(X)$$

This representation is then passed through a fully connected classification layer employing a Softmax activation function to predict the probability distribution over the different categories or classes of machine learning models:

$$\hat{y} = \text{softmax } (Wh_{[CS} + b)$$

The machine learning model can be trained using a cross-entropy loss, which can be defined as:

$$L = -\sum_{i=1}^{M} y_i \log \hat{y}_i$$

where M is the number of machine learning model classes, and $y_i$ is the label for each class. During inference, the machine learning model can be configured to tokenize the input text, compute or determine the hidden state for the CLS token, and apply a Softmax technique to produce the class probabilities. The predicted machine learning model C can be determined as:

$$C = \text{argmax} \hat{y}$$

The model source determination unit 230 can then classify the final score data into selected machine learning categories indicative of the model that could have generated the model-generated text. The model source determination unit 230 can then generate model data 232.

The data identification system 10 can also include a human text determination unit 240 for determining if portions of the input data were generated by humans. Specifically, the normalized data 168 can be introduced into the human text determination unit 240 to determine the source of the human-generated text. The human text determination unit 240 can be configured to recognize the source of human-generated text, even text that has been altered, such as by paraphrasing or modification from the original form of the data. The human text determination unit 240 can employ a contextual similarity technique and leverage both n-grams and sentence embeddings to detect textual similarities, even when the text is not verbatim. According to one embodiment, the human text determination unit 240 can employ a cosine similarity model for determining the source of the human-generated text. The model can calculate a contextual similarity between suspected plagiarized text and a potential text source. This is done by using a combination of n-gram matching and a cosine similarity based on the sentence embeddings. Specifically, the model employed by the human text determination unit 240 can tokenize the data 168 into words, and a vector representation of each text block can be generated. This can be performed using the following formula for vectorization of text T:

$$V_T = \sum_{i=1}^{n} w_i$$

where $w_i$ represents the word vectors in the text T. This can be implemented using a word frequency counter as follows:

$$V(T) = \text{Counter (words)}$$

where words refer to the list of tokenized words from the text. To determine similarity between two text vectors, V1 and V2, the human text determination unit 240 can calculate the cosine similarity:

$$\cos(\theta) = \frac{V_1 \cdot V_2}{|V_1||V_2|}$$

where the dot represents the dot product and ||V1|| refers to the Euclidean norm of the vector. The cosine similarity measures the alignment between two text blocks, identifying matching word patterns and their frequencies. In addition to n-grams, the human text determination unit 240 can utilize sentence embeddings through pre-trained transformer models to capture the semantic similarity between sentences in the input data 168. This allows the model to compare the meaning of two sentences, even if the word choice within the sentences differs. The sentence embedding $E_T$ is a high-dimensional vector generated for a given sentence T:

$$E_T = \text{encode } (T)$$

The human text determination unit 240 can then calculate or determine a semantic similarity using the cosine similarity between the sentence embeddings by:

$$\cos(\theta) = \frac{E_1 \cdot E_2}{|E_1||E_2|}$$

This enables the human text determination unit 240 to detect paraphrased or rephrased content within the input data that cannot be identified by simple word-level matching. When dealing with multiple text blocks from the same data source, the human text determination unit 240 can accurately assign matching segments of text to their corresponding sources. This is achieved by calculating a matching score for each sentence against all potential data sources:

$$\text{Matching Score } (S, C) = \frac{\text{Matched } n\text{-grams}}{\text{Total } n\text{-grams in } S}$$

Where S represents the sentence and C represents the content from the data source. If multiple sources have overlapping content, then the human text determination unit 240 can assign the sentence to the source with the highest cumulative similarity score. The human text determination unit 240 can further refine this by applying a margin-based approach for sequential sentences, ensuring that the human text determination unit 240 maintains consistency in source assignments when similar scores occur across consecutive sentences. The sentence-to-source mapping is updated iteratively:

$$MaxSource(S_j) = \underset{i}{\text{argmax}} ScoreArray[i][j]$$

where $S_j$ is the j-th sentence, and i indexes potential sources. The system 110 also integrates with web search APIs to retrieve potential sources for comparison. For each retrieved web page, the human text determination unit 240 can extract text content and compute or determine the similarity against the input text using both n-grams and sentence embeddings. The URLs of data sources with the highest similarity scores are then stored and ranked based on their relevance to the potentially plagiarized content. The combined n-gram and contextual similarity approach employed by the human text determination unit 240 improves the detection of altered or paraphrased content, ensuring that even complex rewording is flagged, and the original source is identified with high accuracy. The human text determination unit 240 can then generate a similarity score and identify the source of the data that has possibly been copied. This information can form part of the human model data 242.

It is to be understood that although the present invention has been described above in terms of particular embodiments, the foregoing embodiments are provided as illustrative only, and do not limit or define the scope of the invention. Various other embodiments, including but not limited to those described herein, are also within the scope of the claims. For example, elements, units, engines, tools and components described herein may be further divided into additional components or joined together to form fewer components for performing the same functions. Further, the above-described windows or screens or the reference or inference to display or user interfaces can be generated by any selected portion or unit of the governance system 10, 80. The data identification systems can also employ any selected portion or unit of the system to generate user interfaces or suitable reports, for display on the display 370.

Any of the functions disclosed herein may be implemented using means for performing those functions. Such means include, but are not limited to, any of the components disclosed herein, such as the electronic or computing device components described herein.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

The term computing device or electronic device or computer, and which can be used to implement any portion of the governance system, can refer to any device that includes a processor and a computer-readable memory capable of storing computer-readable instructions, and in which the processor is capable of executing the computer-readable instructions in the memory. The terms computer system and computing system if referenced herein refer to a system containing one or more computing devices.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention may operate on digital electronic processes which can only be created, stored, modified, processed, and transmitted by computing devices and other electronic devices. Such embodiments, therefore, address problems which are inherently computer-related and solve such problems using computer technology in ways which could not be solved manually or mentally by humans.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claimed herein which recites that the claimed method is performed or implemented by a computer, a processor, a memory, and/or similar computer-related element, is intended to, and should only be interpreted to, encompass methods which are performed by the recited computer-related element(s) or components. Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Embodiments of the present invention solve one or more problems that are inherently rooted in computer technology. For example, embodiments of the present invention solve the problem of how to use a data identification system to automatically identify and if desired highlight model-generated data in input data. There is no analog to this problem in the non-computer environment, nor is there an analog to the solutions disclosed herein in the non-computer environment.

Furthermore, embodiments of the present invention represent improvements to computer and communication technology itself. For example, the data identification systems of the present invention can optionally employ a specially programmed or special purpose computer in an improved computer system, which may, for example, be implemented within a single computing device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements can also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Figure 6:
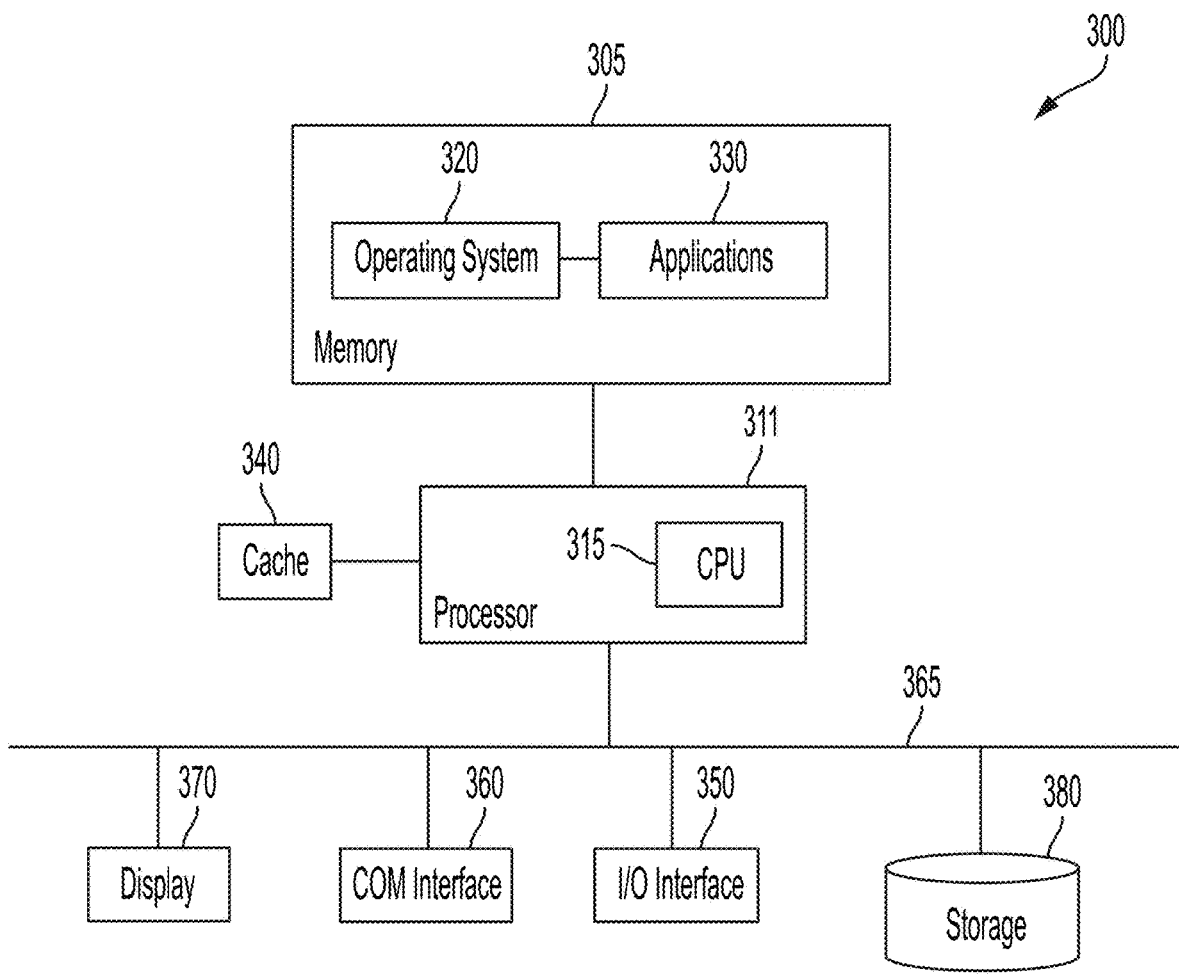
FIG. 6 is a schematic block diagram of exemplary hardware, such as an electronic device, suitable for implementing one or more components of the data identification systems of FIGS. 1 and 3 according to the teachings of the present invention.

It should be appreciated that various concepts, systems, and methods described above can be implemented in any number of ways, as the disclosed concepts are not limited to any particular manner of implementation or system configuration. Examples of specific implementations and applications and the exemplary hardware shown in FIG. 6 are primarily for illustrative purposes and for providing or describing the operating environment of the system of the present invention or the hardware that can be employed to implement the system. The data identification systems 10, 110 and/or any elements, components, or units thereof can employ one or more electronic or computing devices, such as one or more servers, clients, computers, laptops, smartphones and the like, that are networked together or which are arranged so as to effectively communicate with each other. The network can be any type or form of network. The devices can be on the same network or on different networks. In some embodiments, the network system may include multiple, logically grouped servers. In one of these embodiments, the logical group of servers may be referred to as a server farm or a machine farm. In another of these embodiments, the servers may be geographically dispersed. The electronic devices can communicate through wired connections or through wireless connections. The clients can also be generally referred to as local machines, clients, client nodes, client machines, client computers, client devices, endpoints, or endpoint nodes. The servers can also be referred to herein as servers, server nodes, or remote machines. In some embodiments, a client has the capacity to function as both a client or client node seeking access to resources provided by a server or server node and as a server providing access to hosted resources for other clients. The clients can be any suitable electronic or computing device, including for example, a computer, a server, a smartphone, a smart electronic pad, a portable computer, and the like, such as the electronic or computing device 400. The present invention can employ one or more of the illustrated computing devices and can form a computing system. Further, the server may be a file server, application server, web server, proxy server, appliance, network appliance, gateway, gateway server, virtualization server, deployment server, SSL VPN server, or firewall, or any other suitable electronic or computing device, such as the electronic device 300. In one embodiment, the server may be referred to as a remote machine or a node. In another embodiment, a plurality of nodes may be in the path between any two communicating servers or clients. The governance system 10, 80 can be stored on one or more of the clients or servers, and the hardware associated with the client or server, such as the processor or CPU and memory described below.

EXEMPLARY HARDWARE

It should be appreciated that various concepts introduced above and discussed in greater detail below may be implemented in any number of ways, as the disclosed concepts are not limited to any particular manner of implementation or system configuration. Examples of specific implementations and applications are provided below primarily for illustrative purposes and for providing or describing the operating environment of the system of the present invention. The governance system 80 of the present invention can employ a plurality of electronic devices, such as one or more servers, clients, computers and the like, that are networked together, or which are arranged so as to effectively communicate with each other. The network can be any type or form of network. The devices can be on the same network or on different networks. In some embodiments, the network system may include multiple, logically grouped servers. In one of these embodiments, the logical group of servers may be referred to as a server farm or a machine farm. In another of these embodiments, the servers may be geographically dispersed. The devices can communicate through wired connections or through wireless connections. The clients can also be generally referred to as local machines, clients, client nodes, client machines, client computers, client devices, endpoints, or endpoint nodes. The servers can also be referred to herein as servers, nodes, or remote machines. In some embodiments, a client has the capacity to function as both a client or client node seeking access to resources provided by a server or node and as a server providing access to hosted resources for other clients. The clients can be any suitable electronic or computing device, including for example, a computer, a server, a smartphone, a smart electronic pad, a portable computer, and the like, such as the electronic device 300. Further, the server may be a file server, application server, web server, proxy server, appliance, network appliance, gateway, gateway server, virtualization server, deployment server, SSL VPN server, or firewall, or any other suitable electronic or computing device, such as the electronic device 300. In one embodiment, the server may be referred to as a remote machine or a node. In another embodiment, a plurality of nodes may be in the path between any two communicating servers or clients. The data identification systems 10, 110 of the present invention can be stored on one or more of the clients, servers, and the hardware associated with the client or server, such as the processor or CPU and memory described below.

FIG. 6 is a high-level block diagram of an electronic device 300 that can be used with the embodiments disclosed herein. Without limitation, the hardware, software, and techniques described herein can be implemented in digital electronic circuitry or in computer hardware that executes firmware, software, or combinations thereof. The implementation can be as a computer program product (e.g., a non-transitory computer program tangibly embodied in a machine-readable storage device, for execution by, or to control the operation of, one or more data processing apparatuses, such as a programmable processor, one or more computers, one or more servers and the like).

The illustrated electronic device 300 can be any suitable electronic circuitry that includes a main memory unit 305 that is connected to a processor 311 having a CPU 315 and a cache unit 340 configured to store copies of the data from the most frequently used main memory 305.

Further, the methods and procedures for carrying out the methods disclosed herein can be performed by one or more programmable processors executing a computer program to perform functions of the invention by operating on input data and generating output. Further, the methods and procedures disclosed herein can also be performed by, and the apparatus disclosed herein can be implemented as, special purpose logic circuitry, such as a FPGA (field programmable gate array) or an ASIC (application specific integrated circuit). Modules and units disclosed herein can also refer to portions of the computer program and/or the processor/special circuitry that implements that functionality.

The processor 311 is any logic circuitry that responds to, processes or manipulates instructions received from the main memory unit, and can be any suitable processor for execution of a computer program. For example, the processor 311 can be a general and/or special purpose microprocessor and/or a processor of a digital computer. The CPU 315 can be any suitable processing unit known in the art. For example, the CPU 315 can be a general and/or special purpose microprocessor, such as an application-specific instruction set processor, graphics processing unit, physics processing unit, digital signal processor, image processor, coprocessor, floating-point processor, network processor, and/or any other suitable processor that can be used in a digital computing circuitry. Alternatively or additionally, the processor can comprise at least one of a multi-core processor and a front-end processor. Generally, the processor 311 can be embodied in any suitable manner. For example, the processor 311 can be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. Additionally or alternatively, the processor 311 can be configured to execute instructions stored in the memory 305 or otherwise accessible to the processor 311. As such, whether configured by hardware or software methods, or by a combination thereof, the processor 311 can represent an entity (e.g., physically embodied in circuitry) capable of performing operations according to embodiments disclosed herein while configured accordingly. Thus, for example, when the processor 311 is embodied as an ASIC, FPGA or the like, the processor 311 can be specifically configured hardware for conducting the operations described herein. Alternatively, as another example, when the processor 311 is embodied as an executor of software instructions, the instructions can specifically configure the processor 311 to perform the operations described herein. In many embodiments, the central processing unit 530 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The processor can be configured to receive and execute instructions received from the main memory 305. The processor or CPU can also include a graphical processing unit (GPU), which is a specialized processor that is configured to handle and accelerate the rendering of images, animations, and videos. Initially developed to improve graphics performance in gaming and visual applications, GPUs are now widely used for various types of parallel processing, especially in fields of artificial intelligence (AI), machine learning, and scientific computations. Examples of suitable GPUs include the A100, H100, A40, V100, T4, L4, RTX 30 series, RTX 40 series, RTX A series, and Titan RTX GPUs from Nvidia, and the Instinct MI100, Instinct MI200 series, Instinct MI300, Radeon RX 6000 series, Radeon RX 7000 series, Radeon Pro W7000 series, and Radeon Pro W6000 series GPUs from Advanced Micro Devices (AMD).

The electronic device 300 applicable to the hardware of the present invention can be based on any of these processors, or any other processor capable of operating as described herein. The central processing unit 315 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i3, INTEL CORE i5, INTEL CORE i7, INTEL CORE i9 and INTEL CORE X.

The processor 311 and the CPU 315 can be configured to receive instructions and data from the main memory 305 (e.g., a read-only memory or a random access memory or both) and execute the instructions. The instructions and other data can be stored in the main memory 305. The processor 311 and the main memory 305 can be included in or supplemented by special purpose logic circuitry. The main memory unit 305 can include one or more memory chips capable of storing data and allowing any storage location to be directly accessed by the processor 311. The main memory unit 305 may be volatile and faster than other memory in the electronic device, or can dynamic random access memory (DRAM) or any variants, including static random access memory (SRAM), Burst SRAM or Synch-Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 305 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 305 can be based on any of the above described memory chips, or any other available memory chips capable of operating as described herein. In the embodiment shown in FIG. 9, the processor 311 communicates with main memory 305 via a system bus 365. The computer executable instructions of the present invention may be provided using any computer-readable media that is accessible by the computing or electronic device 300. Computer-readable media may include, for example, the computer memory or storage unit 305. The computer storage media may also include, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer readable storage media does not include communication media. Therefore, a computer storage or memory medium should not be interpreted to be a propagating signal per se or stated another transitory in nature. The propagated signals may be present in a computer storage media, but propagated signals per se are not examples of computer storage media, which is intended to be non-transitory. Although the computer memory or storage unit 305 is shown within the computing device 300 it will be appreciated that the storage may be distributed or located remotely and accessed via a network or other communication link.

The main memory 305 can comprise an operating system 320 that is configured to implement various operating system functions. For example, the operating system 320 can be responsible for controlling access to various devices, memory management, and/or implementing various functions of the asset management system disclosed herein. Generally, the operating system 320 can be any suitable system software that can manage computer hardware and software resources and provide common services for computer programs.

The main memory 305 can also hold application software 330. For example, the main memory 305 and application software 330 can include various computer executable instructions, application software, and data structures, such as computer executable instructions and data structures that implement various aspects of the embodiments described herein. For example, the main memory 305 and application software 330 can include computer executable instructions, application software, and data structures, such as computer executable instructions and data structures that implement various aspects of the content characterization systems disclosed herein, such as processing and capture of information. Generally, the functions performed by the content characterization systems disclosed herein can be implemented in digital electronic circuitry or in computer hardware that executes software, firmware, or combinations thereof. The implementation can be as a computer program product (e.g., a computer program tangibly embodied in a non-transitory machine-readable storage device) for execution by or to control the operation of a data processing apparatus (e.g., a computer, a programmable processor, or multiple computers). Generally, the program codes that can be used with the embodiments disclosed herein can be implemented and written in any form of programming language, including compiled or interpreted languages, and can be deployed in any form, including as a stand-alone program or as a component, module, subroutine, or other unit suitable for use in a computing environment. A computer program can be configured to be executed on a computer, or on multiple computers, at one site or distributed across multiple sites and interconnected by a communications network, such as the Internet.

The processor 311 can further be coupled to a database or data storage 380. The data storage 380 can be configured to store information and data relating to various functions and operations of the content characterization systems disclosed herein. For example, as detailed above, the data storage 380 can store information including but not limited to captured information, multimedia, processed information, and characterized content.

A wide variety of I/O devices may be present in or connected to the electronic device 300. For example, the device can include a display 370. The display 370 can be configured to display information and instructions received from the processor 311. Further, the display 370 can generally be any suitable display available in the art, for example a Liquid Crystal Display (LCD), a light emitting diode (LED) display, digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS)

displays, or 3D displays, or electronic papers (e-ink) displays. Furthermore, the display 370 can be a smart and/or touch sensitive display that can receive instructions from a user and forwarded the received information to the processor 311. The input devices can also include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. The output devices can also include video displays, graphical displays, speakers, headphones, inkjet printers, laser printers, and 3D printers.

The electronic device 300 can also include an Input/Output (I/O) interface 350 that is configured to connect the processor 311 to various interfaces via an input/output (I/O) device interface 380. The device 300 can also include a communications interface 360 that is responsible for providing the circuitry 300 with a connection to a communications network (e.g., communications network 120). Transmission and reception of data and instructions can occur over the communications network.

We claim:

1. A computer-implemented method for processing input data and determining a source of model-generated data in the input data, the method performed by at least one computer processor executing computer-readable instructions tangibly stored on at least one computer-readable medium, the method comprising the steps of preprocessing the input data to clean and normalize the input data and generating in response normalized data, the step of preprocessing including cleaning the input data and generating cleaned data, tokenizing the cleaned data and generating tokenized data, mitigating bias present within the tokenized data by applying a first transformer type machine learning model thereto and then generating in response bias mitigated data, and normalizing the bias mitigated data and generating normalized data, detecting if the model-generated data is present within the normalized data, the step of detecting including segmenting the normalized data into a discrete data segments using a tokenization technique and then generating segmented data, applying a shifting windowing function to the segmented data to define, via a data window, a selected window size of segmented data and then generating window data in response thereto, applying a second transformer type machine learning model to the window data and generating one or more probability scores based on the window data, wherein the probability score is indicative of a likelihood that the window data includes model-generated data, and then generating scoring data in response to the window data, highlighting one or more portions of the scoring data that includes the model-generated data, and then generating highlight data in response to the scoring data, and determining a final probability score based on the highlighted data and then generating final score data, and determining, based on the final score data, the source of the model-generated data.

2. The computer-implemented method of claim 1, wherein the step of mitigating bias present within the tokenized data by applying a first transformer type machine learning model comprises applying the first transformer type machine learning model comprises applying a T5 based sequence-to-sequence model to the tokenized data.

3. The computer-implemented method of claim 2, further comprising training the T5 based sequence-to-sequence model on a dataset that includes paired data that includes a raw text data and a corrected text data.

4. The computer-implemented method of claim 3, wherein the second transformer type machine learning model is a bidirectional encoder representations from transformer (BERT) model.

5. The computer-implemented method of claim 4, wherein the step of applying a shifting windowing function to the segmented data comprises defining the data window to have a selected window size with the shifting windowing function, wherein the window size corresponds to a plurality of sentences, wherein the plurality of sentences includes at least a first sentence, a second sentence, and a third sentence.

6. The computer-implemented method of claim 5, wherein the step of applying a second transformer type machine learning model to the window data and generating one or more probability scores comprises determining a probability score associated with each of the first sentence, the second sentence, and the third sentence.

7. The computer-implemented method of claim 6, further comprising shifting the data window by at least one sentence to form a new data window, wherein the new data window includes at least the second sentence, the third sentence, and a fourth sentence, and determining a probability score for each of the second sentence, the third sentence, and the fourth sentence in the new data window.

8. The computer-implemented method of claim 7, wherein for each of the sentences that have multiple probability scores associated therewith, further comprising determining an average probability score from the multiple probability scores for each sentence.

9. The computer-implemented method of claim 8, wherein the step of highlighting one or more portions of the scoring data comprises classifying the scoring data into a plurality of selected scoring categories.

10. The computer-implemented method of claim 9, wherein the step of determining a final probability score comprises determining the final probability score by averaging the probability scores associated with each sentence in the highlighted data.

11. The computer-implemented method of claim 10, wherein the step of determining a model source comprises applying a third transformer type machine learning model to the final score data for determining the model source based on the final score data.

12. The computer-implemented method of claim 11, wherein the third transformer-type machine learning model comprises a robustly optimized BERT approach (RoBERTa) model to process the final score data and to classify the final score data into one or more of a plurality of classifications corresponding to selected types of machine learning models.

13. The computer-implemented method of claim 12, further comprising determining whether portions of the normalized data are human-generated data and to determine the source of the human-generated data.

14. The computer-implemented method of claim 13, wherein the step of determining whether portions of the normalized data are human-generated data comprises applying a contextual similarity technique to determine the source of the human-generated data.

15. A system for processing input data and determining a source of model-generated data in the input data, comprising a preprocessing unit for preprocessing the input data so as to clean and to normalize the input data, and generating in response normalized data, the preprocessing unit including a cleaning unit for cleaning the input data and generating cleaned data, a tokenization unit for tokenizing the cleaned data and generating tokenized data, a bias mitigation unit for applying a first transformer type machine learning model to the tokenized data to mitigate any bias present within the tokenized data and for generating bias mitigated data, and a normalization unit for normalizing the bias mitigated data and generating in response the normalized data, a model detection unit for detecting model-generated data within the normalized data, scoring the model-generated data, and then highlighting the model-generated data, the model detection unit including a segmentation unit for segmenting the normalized data into discrete data segments using a tokenization technique and then generating segmented data, a shifting window analysis unit for applying a shifting windowing function to the segmented data to define, via a data window, a selected size of segmented data and generating in response window data, a data scoring unit for applying a second transformer type machine learning model to the window data and generating one or more probability scores associated with one or more portions of the window data, wherein the probability score is indicative of a likelihood that the one or more portions of the window data include the model-generated data, wherein the data scoring unit generates scoring data, a data highlight unit for receiving the scoring data and for highlighting one or more portions of the scoring data that includes the model-generated data, wherein the data highlighting unit generates highlighted data, and a final scoring unit for determining a final probability score of the highlighted data and generating final score data, and a model source determination unit for determining, based on the final score data, the source of the model-generated data.

16. The system of claim 15, wherein the first transformer type machine learning model comprises a T5 based sequence-to-sequence model.

17. The system of claim 16, wherein the T5 based sequence-to-sequence model is trained on a dataset that comprises paired data that includes a raw text data and a corrected text data.

18. The system of claim 16, wherein the second transformer type machine learning model is a BERT model.

19. The system of claim 18, wherein the data window defined by the shifting windowing function of the shifting window analysis unit has a selected window size corresponding to a plurality of sentences, wherein the plurality of sentences includes at least a first sentence, a second sentence, and a third sentence, and wherein the data scoring unit determines a probability score associated with each of the first sentence, the second sentence, and the third sentence.

20. The system of claim 19, wherein the shifting windowing function shifts the data window by at least one sentence to form a new data window, wherein the new data window includes at least the second sentence, the third sentence, and a fourth sentence, and wherein the data scoring unit determines a probability score for each of the second sentence, the third sentence, and the fourth sentence in the new data window.

21. The system of claim 20, wherein for each of the sentences that have multiple probability scores associated therewith, the data scoring unit determines an average probability score for each of the sentences.

22. The system of claim 21, wherein the data highlight unit is configured to classify the scoring data into a plurality of selected scoring categories.

23. The system of claim 22, wherein the final scoring unit determines the final probability score by averaging the probability scores associated with each sentence in the highlighted data.

24. The system of claim 20, wherein the model source determination unit applies a third transformer type machine learning model to the final score data for determining the source of the model-generated data based on the final score data.

25. The system of claim 24, further comprising a human text determination unit for determining whether portions of the normalized data are human-generated data and to determine the source of the human-generated data.

26. The system of claim 25, wherein the human text determination unit employs a contextual similarity technique to determine the source of the human-generated data.

27. A non-transitory, computer readable medium comprising computer program instructions tangibly stored on the computer readable medium, wherein the computer program instructions are executable by at least one computer processor to perform a method for processing input data and determining a source of model-generated data in the input data, the method comprising:

preprocessing the input data to clean and normalize the input data and generating in response normalized data, the step of preprocessing including cleaning the input data and generating cleaned data, tokenizing the cleaned data and generating tokenized data, mitigating bias present within the tokenized data by applying a first transformer type machine learning model thereto and then generating in response bias mitigated data, and normalizing the bias mitigated data and generating normalized data, detecting if the model-generated data is present within the normalized data, the step of detecting including segmenting the normalized data into a discrete data segments using a tokenization technique and then generating segmented data, applying a shifting windowing function to the segmented data to define, via a data window, a selected window size of segmented data and then generating window data in response thereto, applying a second transformer type machine learning model to the window data and generating one or more probability scores based on the window data, wherein the probability score is indicative of a likelihood that the window data includes model-generated data, and then generating scoring data in response to the window data, highlighting one or more portions of the scoring data that includes the model-generated data, and then generating highlight data in response to the scoring data, and determining a final probability score based on the highlighted data and then generating final score data, and determining, based on the final score data, the source of the model-generated data.

28. The computer readable medium of claim 27, further comprising defining the data window to have a selected window size with the shifting windowing function, wherein the window size corresponds to a plurality of sentences, wherein the plurality of sentences includes at least a first sentence, a second sentence, and a third sentence, and determining a probability score associated with each of the first sentence, the second sentence, and the third sentence.

29. The computer readable medium of claim 28, further comprising shifting the data window by at least one sentence to form a new data window, wherein the new data window includes at least the second sentence, the third sentence, and a fourth sentence, and determining a probability score for each of the second sentence, the third sentence, and the fourth sentence in the new data window.

30. The computer readable medium of claim 29, further comprising determining whether portions of the normalized data are human-generated data by applying a contextual similarity technique and determining the source of the human-generated data.

\* \* \* \* \*